US012597210B2

(12) United States Patent
Ladavac

(10) Patent No.: US 12,597,210 B2
(45) Date of Patent: Apr. 7, 2026

(54) GENERATING POLYGON MESHES APPROXIMATING SURFACES WITH SUB-CELL FEATURES

(71) Applicant: Roblox Corporation, San Mateo, CA (US)

(72) Inventor: Alen Ladavac, Zagreb (HR)

(73) Assignee: Roblox Corporation, San Mateo, CA (US)

( * ) Notice: Subject to any disclaimer, the term of this patent is extended or adjusted under 35 U.S.C. 154(b) by 178 days.

(21) Appl. No.: 18/608,654

(22) Filed: Mar. 18, 2024

(65) Prior Publication Data

US 2025/0292509 A1    Sep. 18, 2025

(51) Int. Cl.
G06T 17/20 (2006.01)
(52) U.S. Cl.
CPC .................................. G06T 17/205 (2013.01)
(58) Field of Classification Search
None
See application file for complete search history.

(56) References Cited

U.S. PATENT DOCUMENTS

| | | | | |
|---|---|---|---|---|
| 8,502,818 B1 * | 8/2013 | Mueller-Fischer | ..... | G06T 17/20 |
| | | | | 345/420 |
| 11,954,802 B2 | 4/2024 | Ladavac et al. | | |
| 2004/0189638 A1 * | 9/2004 | Frisken | ................. | G06T 11/203 |
| | | | | 345/441 |

| | | | | |
|---|---|---|---|---|
| 2004/0189653 A1 * | 9/2004 | Perry | .................... | G06T 11/001 |
| | | | | 345/557 |
| 2009/0244065 A1 * | 10/2009 | Storti | ................... | G06V 10/267 |
| | | | | 382/131 |
| 2010/0231583 A1 * | 9/2010 | Furukawa | ............... | G06T 17/00 |
| | | | | 345/419 |
| 2012/0001909 A1 * | 1/2012 | Garg | ....................... | G06T 17/20 |
| | | | | 345/423 |

(Continued)

OTHER PUBLICATIONS

Cavarga, Martin, "The Fast Sweeping Algorithm", Retrieved from Internet: https://mshgrid.com/2021/02/04/the-fast-sweeping-algorithm/, Feb. 4, 2021, 15 pages.

(Continued)

*Primary Examiner* — Jason A Pringle-Parker
(74) *Attorney, Agent, or Firm* — IP Spring

(57) ABSTRACT

Generating polygon meshes approximating surfaces with sub-cell features. In some implementations, a computer-implemented method includes obtaining a signed distance field (SDF) grid that includes a plurality of cells, the cells including cell values that indicate distances of the cells to a surface that distinguishes an inside and an outside of an object. A boundary mesh is determined having boundary vertices and boundary faces of particular cells in the SDF grid that are based at least on cells within a threshold distance of the surface. Offset cell positions are determined for centers of neighboring cells that neighbor the boundary mesh. The offset cell positions are based on corner gradients of the neighboring cells. An adjusted mesh is generated that approximates the surface, the adjusted mesh defined by mesh vertices that are based on the boundary vertices of the boundary mesh that are displaced based on the offset cell positions.

20 Claims, 11 Drawing Sheets

(56)  References Cited

U.S. PATENT DOCUMENTS

| | | | | |
|---|---|---|---|---|
| 2015/0145985 | A1* | 5/2015 | Gourlay ................. | G06T 17/00 |
| | | | | 348/135 |
| 2016/0364907 | A1* | 12/2016 | Schoenberg ......... | G02B 27/017 |
| 2020/0273246 | A1* | 8/2020 | Rockwood .............. | G06T 17/20 |
| 2022/0383593 | A1* | 12/2022 | Aigerman ............... | G06T 19/20 |
| 2022/0392162 | A1* | 12/2022 | Shen ....................... | G06T 17/20 |
| 2023/0316646 | A1* | 10/2023 | Chen ........................ | G06T 7/50 |
| | | | | 345/419 |
| 2023/0394767 | A1 | 12/2023 | Ladavac et al. | |

OTHER PUBLICATIONS

Gibson, Sarah F. Frisken, "Constrained Elastic SurfaceNets: Generating Smooth Models from Binary Segmented Data", Mitsubishi Electric Research Laboratories, Inc., TR99 24, 1999, 13 pages.
Lorensen, et al., "Marching cubes: a high resolution 3D surface construction algorithm", Seminal graphics: pioneering efforts that shaped the field, 1998, pp. 347-353.
Wronski, Bart, "Computing gradients on grids of pixels and voxels—forward, central, and . . . diagonal differences,", Retrieved from Internet: https://bartwronski.com/2021/02/28/computing-gradients-on-grids-forward-central-and-diagonal-differences/, Feb. 28, 2021, 20 pages.
Zhao, Hongkai, "A fast sweeping method for Eikonal equations", Mathematics of Computation, vol. 74, No. 250, 2005, pp. 603-627.

* cited by examiner

100

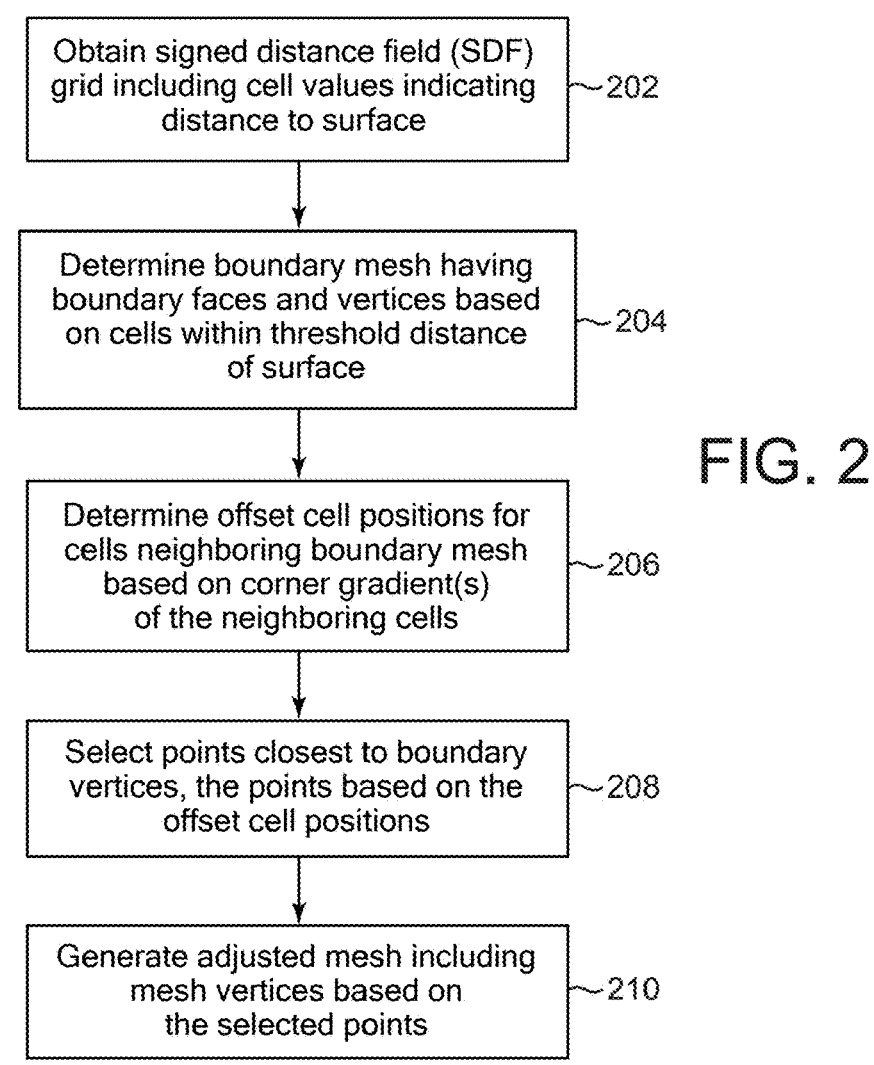

200

Obtain signed distance field (SDF) grid including cell values indicating distance to surface ~202

Determine boundary mesh having boundary faces and vertices based on cells within threshold distance of surface ~204

Determine offset cell positions for cells neighboring boundary mesh based on corner gradient(s) of the neighboring cells ~206

Select points closest to boundary vertices, the points based on the offset cell positions ~208

Generate adjusted mesh including mesh vertices based on the selected points ~210

FIG. 2

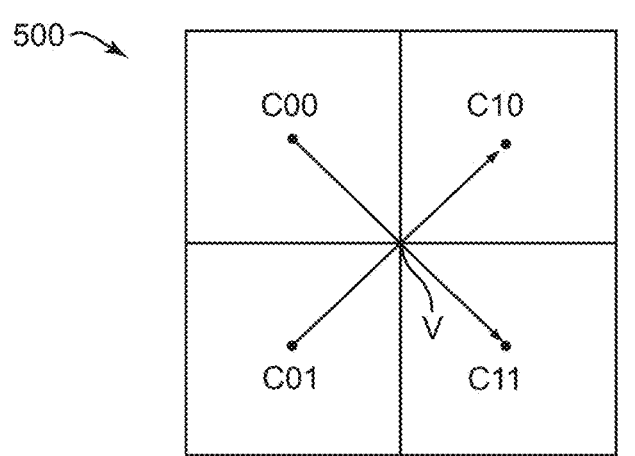

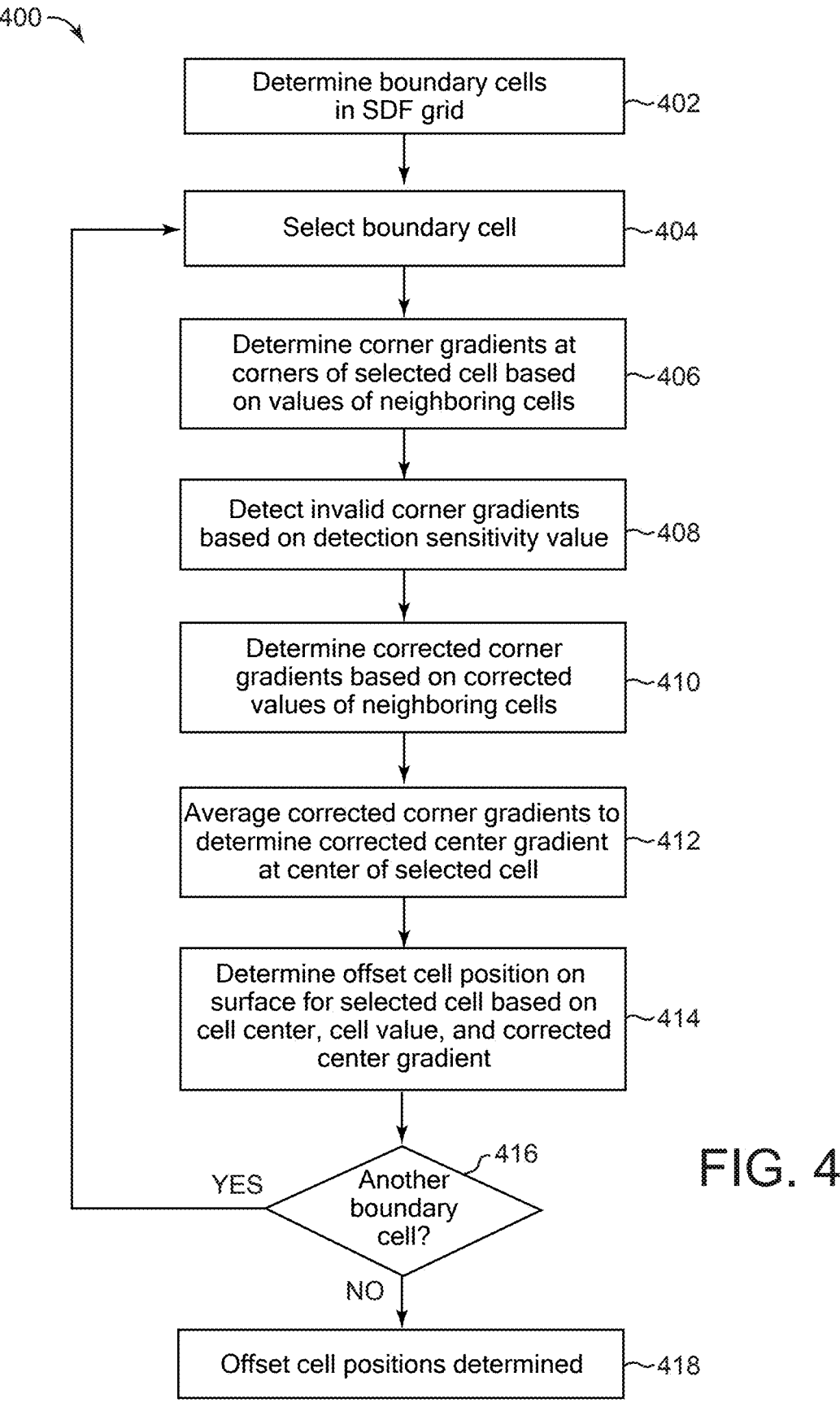

Determine boundary cells
in SDF grid ⁓402

Select boundary cell ⁓404

Determine corner gradients at
corners of selected cell based
on values of neighboring cells ⁓406

Detect invalid corner gradients
based on detection sensitivity value ⁓408

Determine corrected corner
gradients based on corrected
values of neighboring cells ⁓410

Average corrected corner gradients to
determine corrected center gradient
at center of selected cell ⁓412

Determine offset cell position on
surface for selected cell based on
cell center, cell value, and corrected
center gradient ⁓414

416

YES          Another
boundary
cell?

NO

Offset cell positions determined ⁓418

FIG. 4

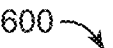

600

Select boundary vertex of boundary mesh ~602

↓

Determine set of neighboring cells of selected boundary vertex that have offset cell positions ~604

↓

Determine features of neighboring cells that lie on boundary of hypercube formed by centers of the neighboring cells ~606

↓

Displace features based on offset cell positions of neighboring cell centers ~608

↓

For each feature, determine a closest point of feature to boundary vertex ~610

↓

For closest points, select particular point closest to selected boundary vertex ~612

↓

YES     Another boundary vertex? 614

NO ↓

Provide particular points for vertices for adjusted mesh ~616

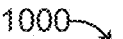
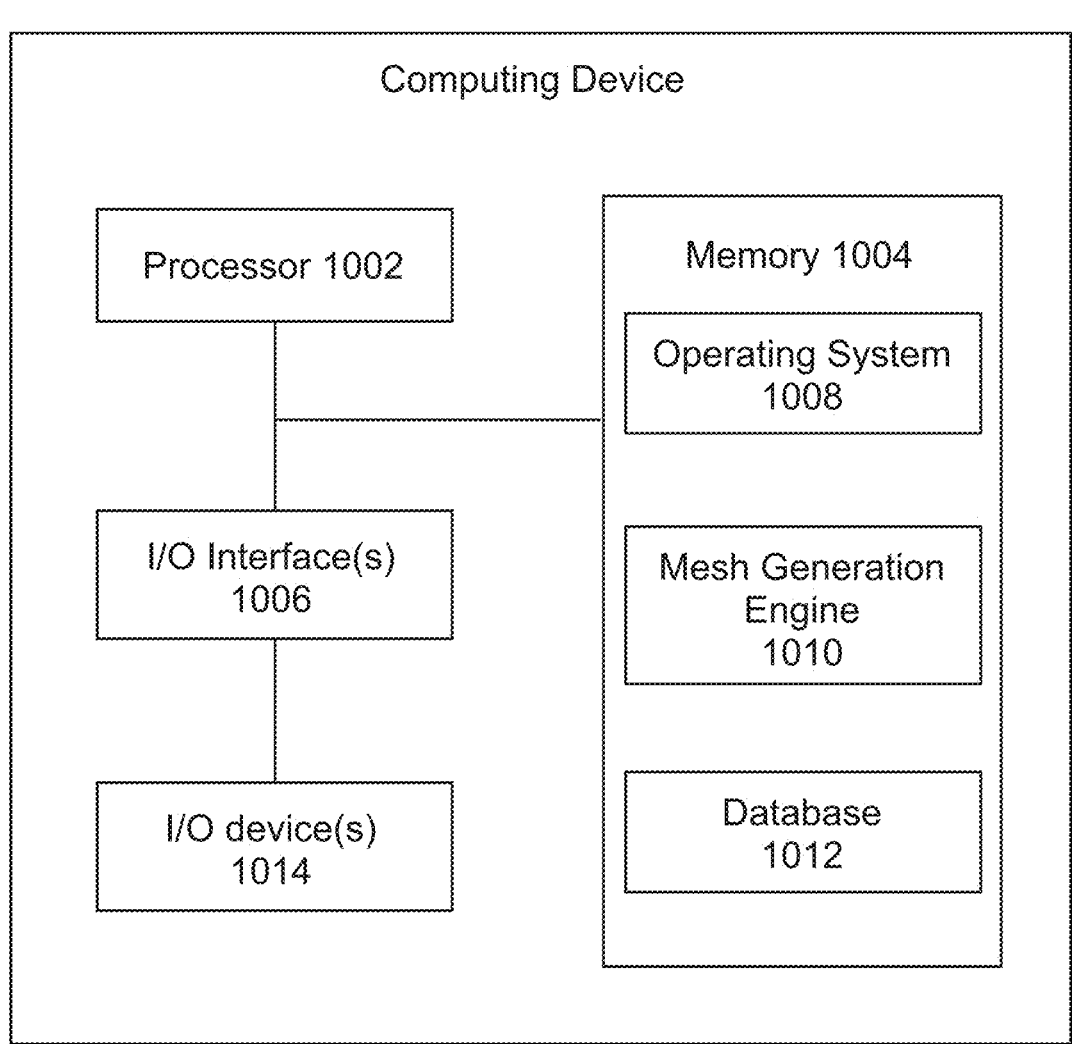
FIG. 10

GENERATING POLYGON MESHES APPROXIMATING SURFACES WITH SUB-CELL FEATURES

TECHNICAL FIELD

This disclosure relates to the field of computer-generated surface approximation and, more particularly, to methods, systems, and computer readable media for generation of polygon meshes that are approximations of surfaces.

BACKGROUND

Rendering of three-dimensional (3D) objects and surfaces for display on display devices is used in a wide array of applications. Images, videos, games, simulations, virtual reality systems, medical imaging, and many other applications render the 3D objects and surfaces for display on two-dimensional (2D) screens and/or in 3D virtual environments based on data that describes the objects and surfaces. Various techniques have been developed to allow devices to efficiently generate, store, and display an approximation of a surface as a mesh of polygons, such as triangles or quadrilaterals, based on input data describing the surface.

Signed Distance Fields (SDFs) are a common representation of 2D or 3D objects and surfaces, e.g., objects and surfaces displayed in a virtual space. In order to be rendered, SDFs may need to be converted into meshes, and various techniques are known for this purpose, including marching cubes, surface nets, etc. Such techniques determine which cells (voxels or pixels) the surface lies between, and a way to displace each vertex so that it lies on the surface. Many techniques find position of the surface by a linear interpolation between two cells having negative and positive values that indicate the presence of the surface.

This functions well for large objects and features (e.g., projections, corners, etc. of an object) in which the thickness of the feature is greater than one cell, so that there is always at least one cell center inside the feature. However, any features smaller than one cell can fall between the cell centers and may not be represented in a created mesh. Thus, generating a mesh for objects with features smaller than the size of one cell can lead to inaccurate results.

The background description provided herein is to present the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to generating polygon meshes approximating surfaces with sub-cell features. In some implementations, a computer-implemented method includes obtaining a signed distance field (SDF) grid that includes a plurality of cells, wherein the cells of the SDF grid include cell values that indicate distances of the cells to a surface that the SDF grid encompasses, the surface distinguishing an inside and an outside of an object. The method includes determining, by one or more processors, a boundary mesh having boundary vertices and boundary faces of particular cells in the SDF grid that are based at least on cells that are within a threshold distance of the surface, and determining, by the one or more processors, offset cell positions for centers of neighboring cells that neighbor the boundary mesh, wherein the offset cell positions are based on corner gradients of the neighboring cells. The method includes generating, by the one or more processors, an adjusted mesh that approximates the surface, wherein the adjusted mesh is defined by mesh vertices that are based on the boundary vertices of the boundary mesh that are displaced based on the offset cell positions.

Various implementations and examples of the method are described. For example, in some implementations, the boundary vertices and the boundary faces of the particular cells in the SDF grid have positions in the SDF grid based on a boundary between a first group of cells inside or within a threshold distance of the surface and a second group of cells that includes other cells of the plurality of cells excluding the first group of cells. In some implementations, each offset cell position is based on a center of a respective cell, a cell value of the respective cell, and a compensated gradient that indicates a direction and magnitude of maximum change of the center of the respective cell toward the surface, wherein the compensated gradient is based on corner gradients of the respective cell.

In some implementations, the corner gradients include at least one corrected corner gradient that is corrected from at least one invalid corner gradient. In some implementations, the at least one invalid corner gradient is detected based on comparing at least one of the corner gradients to a detection sensitivity value. In some implementations, the at least one invalid corner gradient is caused by a portion of the object being positioned between cell centers of two adjacent cells in the SDF grid such that no cell centers are positioned inside the portion of the object.

In some implementations, determining the offset cell positions includes, for each cell of a set of cells of the SDF grid: determining, by the one or more processors, the corner gradients at corners of the cell, wherein the corner gradients are based on cell values of the cell and neighboring cells to the cell; detecting, by the one or more processors, that at least one of the corner gradients of the cell is an invalid corner gradient by comparing the at least one corner gradient to a detection sensitivity value; correcting, by the one or more processors, the invalid corner gradient to provide a corrected corner gradient; determining, by the one or more processors, a compensated gradient for a center of the cell based on the corner gradients including the corrected corner gradient for the cell; and determining, by the one or more processors, an offset cell position for the cell, the offset cell position being a point approximately on the surface that is closest to the center of the cell, wherein the offset cell position is based on the center of the cell, the cell value of the cell, and the compensated gradient. In some implementations, the set of cells only includes cells that each have a center located within a particular distance of an associated boundary vertex of the boundary mesh. In some implementations, correcting the invalid corner gradient includes: correcting the cell values in neighboring cells that contributed to the invalid corner gradient; and recalculating the invalid corner gradient using the corrected cell values to obtain the corrected corner gradient.

In some implementations, the method further includes, after determining the offset cell positions: for each boundary vertex of the boundary mesh, selecting a point based on the offset cell positions of neighboring cells of the boundary vertex, wherein the mesh vertices of the adjusted mesh are the selected points. In some implementations, the point is closest to the boundary vertex of a plurality of points on displaced features based on the offset cell positions of the one or more neighboring cells of the boundary vertex. In some implementations, the method further includes generating, by the one or more processors, an object surface based on the adjusted mesh, the object surface displayable by a display device.

In some implementations, a system includes at least one processor coupled to a memory having stored thereon software instructions that, when executed by the at least one processor, cause the at least one processor to perform operations. The operations include operations that are similar to those described above for the method.

Various implementations and examples of the system are described. For example, the boundary vertices and the boundary faces of the particular cells have positions in the SDF grid based on a boundary between a first group of cells inside or within a threshold distance of the surface and a second group of cells that includes the other cells of the SDF grid excluding the first group of cells. In some implementations, the corner gradients include at least one corrected corner gradient that is corrected from at least one invalid corner gradient caused by a portion of the object being positioned between cell centers of two adjacent cells in the SDF grid such that no cell centers are positioned inside the portion of the object. In some implementations, the operations include, after determining the offset cell positions: for each boundary vertex of the boundary mesh, selecting a point closest to the boundary vertex for points on displaced features based on the offset cell positions of the one or more neighboring cells of the boundary vertex, wherein the mesh vertices of the adjusted mesh are the selected points. In some implementations, the displaced features are features of a hypercube formed from centers of the one or more neighboring cells of the boundary vertex. In some implementations, the operations include generating an object surface based on the adjusted mesh, the object surface displayable by a display device.

In some implementations, a non-transitory computer readable medium with instructions stored thereon that, when executed by a processor, cause the processor to perform operations. The operations include operations similar to those described above for the method and/or system. Various implementations and examples of the system are described. For example, in some implementations, the corner gradients include at least one corrected corner gradient that is corrected from at least one invalid corner gradient.

BRIEF DESCRIPTION OF THE DRAWINGS

FIG. 2 is a flow diagram of an example method to generate a polygon mesh approximating a surface with sub-cell features, in accordance with some implementations.

FIG. 4 is a flow diagram of an example method to determine offset cell positions for cells neighboring a boundary mesh, in accordance with some implementations.

FIG. 5 is a diagrammatic illustration of an example portion of an SDF grid and cells, in accordance with some implementations.

FIG. 6 is a flow diagram of an example method to select points for an adjusted mesh that are displaced boundary vertices, where the points are based on offset cell positions, according to some implementations.

FIG. 10 is a block diagram illustrating an example computing device, in accordance with some implementations.

DETAILED DESCRIPTION

Figure 1:
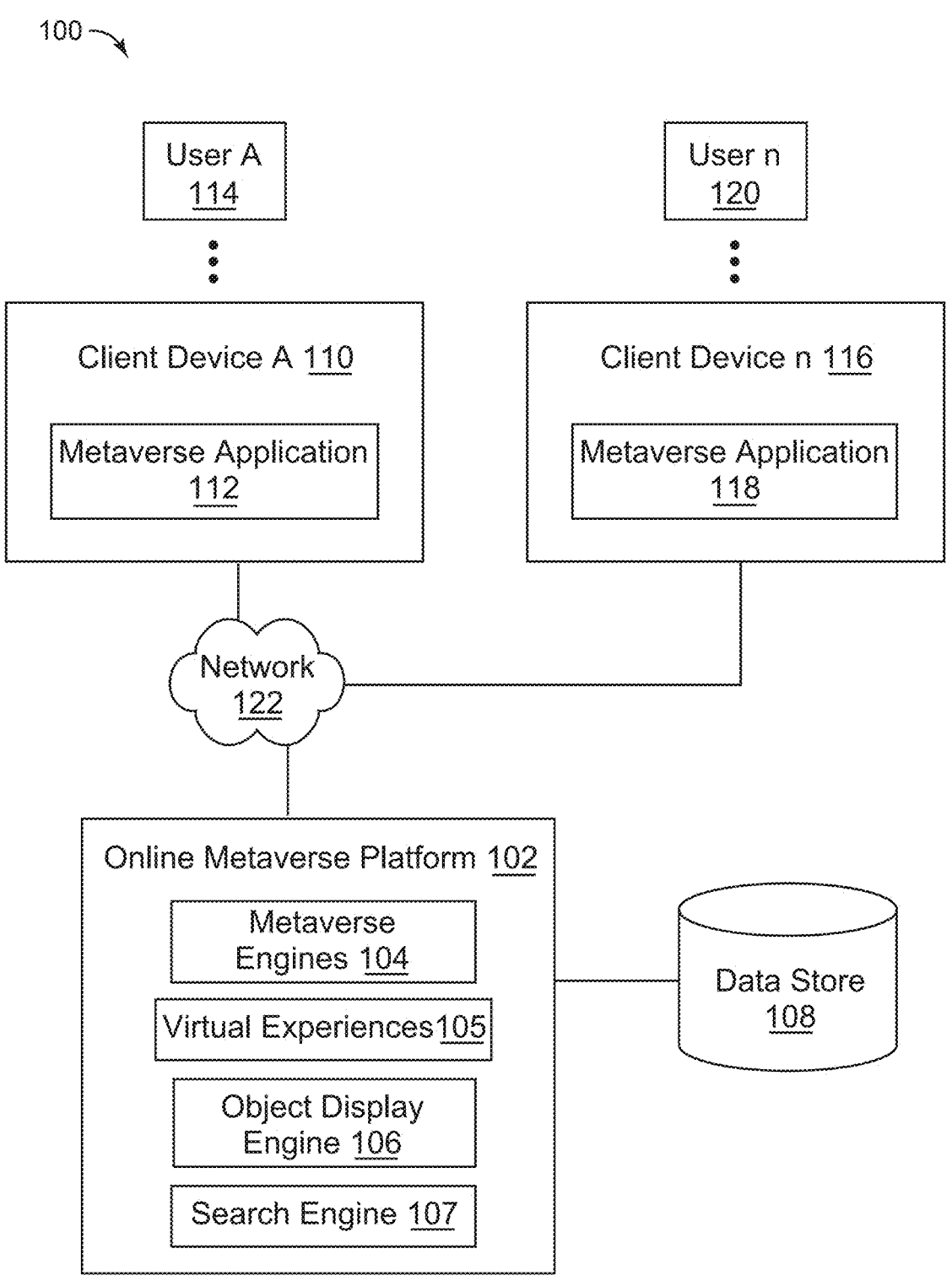
FIG. 1 is a diagram of an example system architecture, in accordance with some implementations.

One or more implementations described herein relate to generating polygon meshes approximating surfaces with sub-cell features. Described computer-implemented methods may include determining a boundary mesh for a signed distance field (SDF) grid that indicates distances of grid cells to a surface of an object (e.g., a volume). The boundary mesh is based at least in part on cells within a threshold distance of the surface. Offset cell positions for centers of cells that neighbor the boundary mesh are determined, where the offset cell positions are based on corner gradients of these cells. An adjusted mesh is generated that approximates the surface, where the adjusted mesh is defined by mesh vertices that are boundary vertices that are displaced based on the offset cell positions.

Various other features are also described. The boundary vertices and the boundary faces have positions in the SDF grid based on a boundary between a first group of cells inside or within a threshold distance of the surface and a second group of cells that includes the other cells of the SDF grid excluding the first group of cells. Each offset cell position can be based on a center of a respective cell, the cell value of the respective cell, and a compensated gradient that indicates a direction and magnitude of maximum change of the center of the respective cell toward the surface, where the compensated gradient is based on the corner gradients of the respective cell. The corner gradients can include one or more corrected corner gradients that are corrected from invalid corner gradients, for example, the invalid corner gradients may be caused by a portion of the object being positioned between cell centers of two adjacent cells in the SDF grid such that no cell centers are positioned inside the portion of the object.

In some implementations, subsequent to determining offset cell positions, for each boundary vertex of the boundary mesh, a point is selected based on the offset cell positions of neighboring cells of the boundary vertex, such that the point is displaced boundary vertex. The selected points (displaced boundary vertices) are the mesh vertices of the adjusted mesh. For example, the point is the closest point to the boundary vertex among various points on displaced features that are based on the offset cell positions of the neighboring cells of the boundary vertex. An object surface can be generated based on the adjusted mesh, the object surface being displayable by a display device.

Described features generate an accurate mesh from an SDF grid that represents an object or surface. An SDF is a field of scalar values associating each location in space with a scalar value d, representing a signed distance value, which is a distance from that point to a closest point on the surface of an object. The distance can be considered negative on the inside of the object and positive on the outside, or vice versa. The surface of the object is considered to be the isosurface at sdf=0, or level set at value 0, signifying that the surface consists of all such points where sdf is exactly 0.

Discrete SDF fields, such as SDF grids, are often used since general continuous SDF functions have limited practical usage. An SDF grid is a lattice of rectangular cells (voxels in 3D or pixels in 2D) where the value in each cell is the distance between the center of the cell to the nearest point on the surface. In order to be rendered, SDFs can be converted into meshes using any of various techniques, including marching cubes, surface nets, etc. Such techniques determine which cells the boundary lies between, and displace each vertex so that it lies on the surface. These techniques rely on the observations that negative cells are on one side of the surface and the positive are on the other side, so the boundary must be between opposite-signed cells, and that if there are two points, one with a negative value and the other with a positive value, the position of the zero point (on the surface) can be found by a linear interpolation between the two points.

Such techniques work to generate a mesh for large objects or large features of an object where the thickness of the feature is greater than one cell, so that there is always at least one cell center inside the object or feature. However, features smaller than one cell (e.g., sub-cell features) can be positioned between cell centers and may be overlooked. Thus, inaccurate meshes may result when generated for objects having features that are smaller than the size of one cell. For example, for a long and/or thin object (or object portion) with varied thickness, prior mesh generation techniques may generate incorrect artifacts including "bow-tieing" (e.g., a FIG. 8 outline within the object), separation of the object into multiple spaced-apart outlines, or complete disappearance of sharp features. In another example, prior techniques may blunt corners or other sharp features that fall in between the cell centers, even when the object itself is not very thin (such as one or more corners on a square object).

Features described herein provide improved mesh generation for objects and object features. Described features can detect small, thin, and/or sharp objects and object features that do not cover the centers of SDF grid cells and are present between the centers of the cells. This allows more accurate meshes to be generated for objects and object surfaces that have such small, thin, and/or sharp features, than is possible with previous mesh generation techniques.

Described features thus provide several technical advantages over previous techniques for generating meshes. Described features provide technical advantages that enable reduction of use of computational resources (e.g., computer memory, processor use and processing time, networking traffic bandwidth, display processing and memory usage, etc.) in various described implementations. For example, described techniques generate meshes that more accurately approximate objects and object features compared to previous techniques that may inaccurately approximate such features, distort such features, or miss such features entirely in generated meshes. Thus, described techniques can avoid the use of processing resources needed to edit and correct inaccurate meshes produced by previous techniques. For example, previous techniques may generate inaccurate meshes that require manual and/or automated review and editing and/or other forms of error detection and correction that consumes additional computational resources.

Numbers assigned to components herein, such as "first", "second", or the like, are only used to distinguish described features and elements, rather than describing a particular order or technical feature.

Example System Architecture

FIG. 1 illustrates an example system architecture 100, in accordance with some implementations of the disclosure. System architecture 100 is provided for illustration. In some implementations, the system architecture 100 may include the same, fewer, more, or different elements configured in the same or different manner as that shown in FIG. 1. System architecture 100 (also referred to as "system" herein) includes an online metaverse platform 102, a first client device 110 (generally referred to as "client devices 110/116" herein), a network 122, and a second client device 116. The online metaverse platform 102 can include, among other things, a metaverse engine 104, one or more virtual experiences 105, an object display engine 106, a search engine 107, and a data store 108. The client device 110 can include a metaverse application 112. The client system 116 can include a metaverse application 118. Users 114 and 120 can use client devices 110 and 116, respectively, to interact with the online metaverse platform 102.

The term "virtual experience" or "game," as used herein, refers to any virtual experience in a computer environment depicting a 2D or 3D space, including any types of games or virtual experiences provided for user(s) in a virtual space. A virtual space can be any graphical environment (2D or 3D) which includes one or more displayed virtual objects, and can be a game environment, a virtual reality environment that is fully generated, an augmented reality environment in which part of the displayed environment is generated by a system and part is based on the actual environment in which a user is located (e.g., displayed as images of the actual environment captured by one or more image capture devices such as physical cameras), etc. The virtual experience may include one or more avatars (e.g., character models). An avatar is a virtual object displayed in the virtual space that may be controlled by a human user, or may be a computer-controlled avatar (e.g., a non-player character controlled by a game or other virtual experience). In various implementations, an avatar may be a humanoid, an animal form, a vehicle form, an object form, or in any other form. In some implementations, the avatar or other 3D virtual object may include a mesh (a set of points arranged in 3D space to obtain a virtual object, such as an avatar with body parts such as head, torso, limbs, etc.). Further, in some implementations, one or more textures may be attached to a mesh. A texture may define various visual appearances of the virtual object, such as avatar skin parameters, clothing, etc., and can include color, reflectivity, shape, etc. In various implementations, avatar or object animation may be performed automatically by metaverse engine 104 and/or by metaverse applications (112, 118).

A metaverse platform, as described herein, may include any platform that provides one or more virtual experiences having a virtual space or metaverse. A metaverse application, as described herein, may include any application that enables a user to participate in a virtual experience (e.g., game, etc.), and engage in virtual activity or gameplay, including configuring an avatar, moving about in a virtual space, performing actions, engaging with other avatars, interacting with other users via text/audio/video chat, etc.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online metaverse platform 102 can include a server having one or more computing devices (e.g., a cloud computing system, a rackmount server, a server computer, cluster of physical servers, virtual server, etc.). In some implementations, a server may be included in the online metaverse platform 102, be an independent system, or be part of another system or platform. It may be noted that the online metaverse platform 102 is provided for purposes of illustration, rather than limitation.

In some implementations, the online metaverse platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online metaverse platform 102 and to provide a user with access to online metaverse platform 102. The online metaverse platform 102 may also include a website (e.g., one or more webpages) or application back-end software that may be used to provide a user with access to content provided by online metaverse platform 102. For example, users may access online metaverse platform 102 using the metaverse application 112/118 on client devices 110/116, respectively.

In some implementations, online metaverse platform 102 may be a type of social network providing connections between users or a type of user-generated content system that allows users (e.g., end-users or consumers) to communicate with other users via the online metaverse platform 102, where the communication may include voice chat, video chat, or text chat. In some implementations of the disclosure, a "user" may be represented as a single individual person. However, other implementations of the disclosure encompass a "user" (e.g., creating user) being an entity controlled by a set of users or an automated source. In some implementations, a "user" can include one or more programs or virtual entities, as well as persons that interface with the system or network. In some implementations, online metaverse platform 102 may include a virtual gaming platform. In some implementations, other platforms can be used with the techniques described herein instead of or in addition to online metaverse platform 102. For example, a social networking platform, purchasing platform, messaging platform, creation platform, etc. can be used to provide features thereon.

One or more virtual experiences 105 are provided by the online metaverse platform. In some implementations, a virtual experience 105 can include an electronic file that can be executed or loaded using software, firmware or hardware configured to present the virtual experience content (e.g., digital media item) to an entity. In some implementations, a metaverse application 112/118 of a virtual experience may be executed and one or more virtual experience instances can be rendered in connection with a virtual experience 105 and metaverse engine 104. In some implementations, virtual experiences 105 may have one or more virtual spaces where multiple environments may be linked. An example of a virtual space may be a three-dimensional (3D) virtual space. One or more virtual spaces of virtual experience(s) may be collectively referred to a "world" or "gaming world" or "virtual world" or "universe" herein. An example of a world may be a 3D world of a game. For example, a user may build a virtual space that is linked to another virtual space created by another user. An avatar in the virtual space may cross the virtual border of one virtual space to enter an adjacent virtual space.

It may be noted that virtual spaces or 3D worlds use graphics that use a three-dimensional representation of geometric data representative of virtual experience content (or at least present such content to appear as 3D content whether or not 3D representation of geometric data is used). 2D environments or 2D worlds use graphics that use two-dimensional representation of geometric data representative of virtual experience content.

In some implementations, the online metaverse platform 102 can host one or more virtual experiences 105 and can permit users to interact with the virtual experiences 105 (e.g., create, modify, search for, request, and/or join a virtual experience 105, virtual experience instances of virtual experience 105, virtual experience-related content, or other content) using a metaverse application 112/118 of client devices 110/116. Users (e.g., 114 and/or 120) of the online metaverse platform 102 may play, create, interact with, or build virtual experiences 105, search for virtual experiences 105, communicate with other users, create and build objects (e.g., also referred to as "item(s)" or "virtual experience objects" or "virtual experience item(s)" herein) of virtual experiences 105, and/or select or search for objects. For example, when generating user-generated virtual items, users may create avatars, attributes, actions, or animations for the created avatars, decoration for the avatars, one or more virtual spaces for an interactive virtual experience, or build structures used in a virtual experience, among others. In some implementations, users may buy, sell, or trade virtual experience objects, such as in-platform currency (e.g., virtual currency), with other users of the online metaverse platform 102. In some implementations, online metaverse platform 102 may transmit virtual experience content to metaverse applications (e.g., 112). In some implementations, virtual experience content (also referred to as "content" herein) may refer to any data or software instructions (e.g., virtual experience objects, virtual space and features therein, virtual experience, user information, video, images, commands, media item, etc.) associated with online metaverse platform 102 or metaverse applications. In some implementations, virtual experience objects (e.g., also referred to as "item(s)," "objects," "virtual objects," or "virtual experience item(s)" herein) may refer to objects that are used, created, shared or otherwise depicted in virtual experiences 105 of the online metaverse platform 102 or metaverse applications 112 or 118 of the client devices 110/116. For example, virtual experience objects may include a part, model, avatar, tools, weapons, clothing, buildings, vehicles, currency, flora, fauna, components of the aforementioned (e.g., windows of a building), and so forth.

In some implementations, a user can create or modify a computer model that is a virtual experience object, such as an avatar used in one or more virtual experiences. For example, the user can create or modify a skeleton (e.g., rig), shape, surface texture and color, and/or other attributes of an avatar. In some examples, an avatar can be similar to a human body model. In some implementations, an avatar can be animated by a user, e.g., instructed to move within a computer generated environment according to a particular sequence of moves. In some implementations, a virtual camera provides a view of the virtual space that is displayed on a display device for the user (e.g., on a client device 110 or 116).

In some implementations, online metaverse platform 102 or client devices 110/116 may include metaverse engines 104 or metaverse application 112/118. In some implementations, metaverse engines 104 can include a metaverse application similar to metaverse application 112/118. In some implementations, metaverse engines 104 may be used for the development and/or execution of virtual experiences 105. For example, metaverse engines 104 may include a rendering engine ("renderer") for 2D, 3D, VR, or AR graphics, a physics engine, a collision detection engine (and collision response), sound engine, scripting functionality, artificial intelligence engine, networking functionality, streaming functionality, memory management functionality, threading functionality, scene graph functionality, or video support for cinematics, among other features.

Metaverse platform 102 may also include an object display engine 106 that can interface with metaverse engines 104 and virtual experiences 105. Object display engine 106 can access object and virtual space data, cause and detect movement and interaction of objects, and provide other display functions for objects and other features of a displayed virtual space. Object data and other data (e.g., virtual space data) can be stored and accessed in database 108 and/or other storage of platform 102. In some implementations, object display engine 106 can be implemented partially or completely on a client device 110 and/or 116.

In some implementations, online metaverse platform 102 can generate meshes based on input data using one or more of the methods and features described herein. In some implementations, one or more client devices can generate meshes based on input data using one or more of the methods and features described herein. For example, metaverse engines 104 and/or object display engine 106 may include a mesh generation engine including features as described herein.

The components of the metaverse engines 104 may generate commands that help compute and render a virtual experience instance of a virtual experience 105 (e.g., rendering commands, collision commands, physics commands, etc.). In some implementations, metaverse applications 112/118 of client devices 110/116, respectively, may work independently, in collaboration with metaverse engine 104 of online metaverse platform 102, or a combination of both.

In some implementations, both the online metaverse platform 102 and client devices 110/116 execute a metaverse engine/application (104, 112, and 118, respectively). The online metaverse platform 102 using metaverse engine 104 may perform some or all the metaverse engine functions (e.g., generate physics commands, rendering commands, etc.), or offload some or all the metaverse engine functions to metaverse applications 112 and 118 of client devices 110 and 116, respectively. In some implementations, each virtual experience 105 may have a different ratio between the metaverse engine functions that are performed on the online metaverse platform 102 and the metaverse engine functions that are performed on the client devices 110 and 116.

For example, players may be participating in a virtual experience instance of virtual experience 105 on client devices 110 and 116, and may send control instructions (e.g., user inputs, such as directional inputs of right, left, up, down, avatar position and velocity information, text, voice input, etc.) to the online metaverse platform 102. Subsequent to receiving control instructions from the client devices 110 and 116, the online metaverse platform 102 may send instructions (e.g., position and velocity information of the avatars participating in the group gameplay or commands, such as rendering commands, collision commands, etc.) to the client devices 110 and 116 based on control instructions (e.g., including avatar and object animation data). For instance, the online metaverse platform 102 may perform one or more logical operations (e.g., using metaverse engine 104) on the control instructions to generate gameplay instruction for the client devices 110 and 116. In other instances, online metaverse platform 102 may pass one or more or the control instructions from one client device 110 to other client devices (e.g., 116) participating in the virtual experience instance. The client devices 110 and 116 may use the gameplay instructions and render the gameplay for presentation on the displays of client devices 110 and 116.

In some implementations, a component, such as a body part, may be a primitive geometrical shape such as a block, a cylinder, a sphere, etc., or some other primitive shape such as a wedge, a torus, a tube, a channel, etc. In some implementations, a creation and editing module and interface of metaverse application 112/118 (or virtual experience engines 104) may publish a user's avatar for view or use by other users of the online metaverse platform 102. In some implementations, creating, modifying, or customizing avatars, other virtual experience objects, virtual experiences 105, or virtual spaces may be performed by a user using a user interface (e.g., developer interface) and with or without scripting (or with or without an application programming interface (API)).

In some implementations, online metaverse platform 102 may include a search engine 107. In some implementations, the search engine 107 may be a system, application, or module that permits the online metaverse platform 102 to provide search functionality to users, where the search functionality permits the users to search virtual experiences 105 that are available, the most popular virtual experiences, virtual experience instances that are looking for players, virtual experience assets available on the metaverse platform 102, etc.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online metaverse platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the metaverse application 112 or 118, respectively. In one implementation, the metaverse application 112 or 118 may permit users to use and interact with online metaverse platform 102, such as search for a virtual experience or other content, control a virtual avatar in a virtual experience hosted by online metaverse platform 102, or view or create or upload content, such as virtual experiences 105, images, avatars, and other objects, model animations, videos, web pages, documents, and so forth. In one example, the metaverse application may be a web application (e.g., an application that operates in conjunction with a web browser) that can access, retrieve, present, or navigate content (e.g., avatar in a virtual space, etc.) served by a web server. In another example, the metaverse application may be a native application (e.g., a mobile application, app, or a gaming program) that is installed and executes local to client device 110 or 116 and allows users to interact with online metaverse platform 102. The metaverse application may render, display, or present the content (e.g., a web page, a media viewer) to a user. In an implementation, the metaverse application may also include an embedded media player (e.g., a Flash® player) that is embedded in a web page.

According to aspects of the disclosure, the metaverse application 112/118 may be an online metaverse platform application for users to build, create, edit, upload content to the online metaverse platform 102 as well as interact with online metaverse platform 102 (e.g., play virtual experiences 105 hosted by online metaverse platform 102). As such, the metaverse application 112/118 may be provided to the client device 110 or 116 by the online metaverse platform 102. In another example, the metaverse application 112/118 may be an application that is downloaded from a server.

In general, functions described in one implementation as being performed by the online metaverse platform 102 can also be performed by the client device(s) 110 or 116, or a server, in other implementations if appropriate. In addition, the functionality attributed to a particular component can be performed by different or multiple components operating together. The online metaverse platform 102 can also be accessed as a service provided to other systems or devices through appropriate application programming interfaces (APIs), and thus is not limited to use in websites.

Methods to Generate a Polygon Mesh

FIG. 2 is a block diagram illustrating an example method 200 to generate a polygon mesh approximating a surface with sub-cell features, in accordance with some implementations. In some implementations, method 200 can be implemented, for example, on a server system, e.g., online metaverse platform 102 as shown in FIG. 1 and/or computing device 1000 as shown in FIG. 10. In some implementations, method 200 can be performed at least in part by metaverse engine(s) 104 of online metaverse platform 102. In some implementations, some or all of the method 200 can be implemented on a system such as one or more client devices 110 and 116 as shown in FIG. 1, and/or on both a server system and one or more client systems. For example, in some implementations, method 200 can be performed at least in part by metaverse application(s) 112, 118 of client devices 110, 116. In described examples, the implementing system includes one or more processors or processing circuitry, and one or more storage devices such as a database, data structure, or other accessible storage. In some implementations, different components of one or more servers and/or clients can perform different blocks or other parts of the method 200. Method 200 may begin at block 202.

In block 202, a signed distance field (SDF) grid is obtained that includes cell values indicating distances to one or more surfaces. For example, input data may be received by a system performing method 200, where the input data includes a representation of the one or more surfaces (e.g., isosurfaces) within a 2D or a 3D field. The surface can be a continuous, potentially smooth shape. For example, the surface can be a surface of a 2D or 3D object represented in a video game, virtual reality environment, or other virtual space. In some examples, the surface can be a representation of a surface of a physical object or other feature in a scanned or sensed volume or area, such as an organ in a human body, an object in a particular environment (e.g., within a material or element, underground, in outer space, underwater, etc.), a geographical landscape, or other environment. In some implementations, the surface is an isosurface (e.g., level set), defined as the surface for which the field has a constant value. In some implementations, an isosurface threshold can be used.

In some implementations, the surface distinguishes an inside and an outside of an object (e.g., a volume). For example, a represented object can have a volume, where the inside of the volume includes one or more materials of the object, and the outside of the volume is the environment in which the object is located. In some examples, the surface can define where an interior of an object is located (e.g., the walls indicating an interior volume of a car object) and where an exterior to the object is located (e.g., the walls and other outer surfaces indicating space around the car, the surface on which it is located, etc.).

The input data can be in the form of an SDF grid that encompasses and describes the surface. In some implementations, the SDF grid includes multiple cells in a 3D layout, and the cells of the SDF grid are voxels of a voxel grid. In some implementations, the voxels can be cubical in shape. Each cell (at each (x, y, z) position of the grid) has a scalar value. Each scalar value can represent a distance of the center of the cell from the surface. In some implementations, a positive value indicates that the center of the cell is outside the object or above the surface and a negative value indicates that the center of the cell is inside the object or below the surface. In some implementations, values having signs opposite to these examples (negative and positive) can indicate these positions relative to the surface.

In some implementations, a 2D equivalent of the surface can be represented in the input data, such as a line (e.g., an isoline or contour lines). The represented line can be approximated by a mesh using similar techniques to those described herein including method 200. For example, the line can be approximated by being provided multiple different straight segments (e.g., a polyline) and/or approximated curvatures. In some of these 2D implementations, the SDF grid includes multiple cells in a 2D layout, and the cells of the SDF grid are squares of a pixel grid.

In various examples, the SDF field may be provided by an application program, device, or other source. For example, a terrain editing program, constructive solid geometry application, 3D modeling program, magnetic resonance imaging (MRI), X-ray or other volumetric scanner can produce input data received at block 202. In some implementations, data output by such a source is preprocessed before being received at block 202, e.g., encoded in one of the representations described herein (e.g., voxel grid, pixel grid, etc.). Block 202 may be followed by block 204.

In block 204, a boundary mesh is determined that has boundary faces and boundary vertices that have positions in the SDF grid based on cells that are within a threshold distance of the surface. In some implementations, the positions of the boundary faces and the boundary vertices are based on a boundary between a group of cells inside or near the surface and a group of cells that include the other cells of the SDF grid. A "face" as referred to herein is a boundary between two neighboring cells, and is a line segment in a 2D grid, a polygon (e.g., triangle or quadrilateral) in a 3D grid, etc. In some implementations, the boundary is determined based on a threshold distance, e.g., a cell value threshold. Some examples of the boundary mesh determination are described below with respect to FIG. 3. Block 204 may be followed by block 206.

In block 206, offset cell positions are determined for cells that neighbor the boundary mesh, where the offset cell positions are based on corner gradients of these neighboring cells. The offset cell positions indicate points (approximately) on the surface that are closest to the centers of the neighboring cells. In some implementations or cases, the corner gradients include at least one corrected corner gradient. The corrected corner gradients include corrections of invalid corner gradients that may occur due to small or sharp features of the surface. Some examples of determining the offset cell positions are described below with respect to FIG. 4. Block 206 may be followed by block 208.

In block 208, points are selected that are closest to boundary vertices of the boundary mesh determined in block 204, where the points are based on the offset cell positions of block 206. These points are displaced boundary vertices and provide approximate positions of the surface. In some implementations, the points are on features that are displaced based on the offset cell positions, e.g., the features can be vertices, lines, and/or faces of a hypercube that is formed by neighboring cells of the boundary mesh. Some examples of such implementations are described below with respect to FIG. 5. In some implementations, the selected points can be based on the offset cell positions in other ways, e.g., the selected points can be the offset cell positions themselves. Block 208 may be followed by block 210.

In block 210, an adjusted mesh is generated that includes mesh vertices that are based on the selected points determined in block 208. For example, the mesh can be a polygon mesh for a 3D field and surface. For example, the adjusted mesh can be made up of polygons (e.g., triangles or quadrilaterals) where the mesh vertices are the vertices of the polygons. In some implementations, the mesh can be a line mesh for a 2D field and line, where lines are defined and connected by the mesh vertices to create a mesh outline. The adjusted mesh constitutes an approximation of the surface and includes representations of small or sharp features of the surface that are positioned between cell centers of the SDF grid. Using described techniques, the positions of the mesh vertices are determined with greater fidelity to the shape of the object than previous techniques.

The mesh resulting from block 210 can be used as an approximation of the surface represented in the input data. After the positions of the mesh vertices are determined using one or more described techniques, the mesh is defined and can be finalized. In some implementations, the mesh can be additionally processed in various ways, e.g., be assigned characteristics (e.g., colors or textures to fill its polygons), modified to fit a particular object, stored in particular storage, displayed by a display device, etc. The generation of the mesh provides conversion of field input data expressed in the form of an SDF grid into a polygonal mesh that can be used for, e.g., efficient physics simulation, rendering, storage, and/or further editing of the data. Common applications include efficient rendering of terrains, medical images, or objects modeled in a clay-like manner. For example, the mesh can be used in the generation of an object surface of a displayable object (or feature of such an object), such as the surface of a terrain feature (landscape, mountains, etc.), organ or other body part, digital game object, etc.

Figure 3:
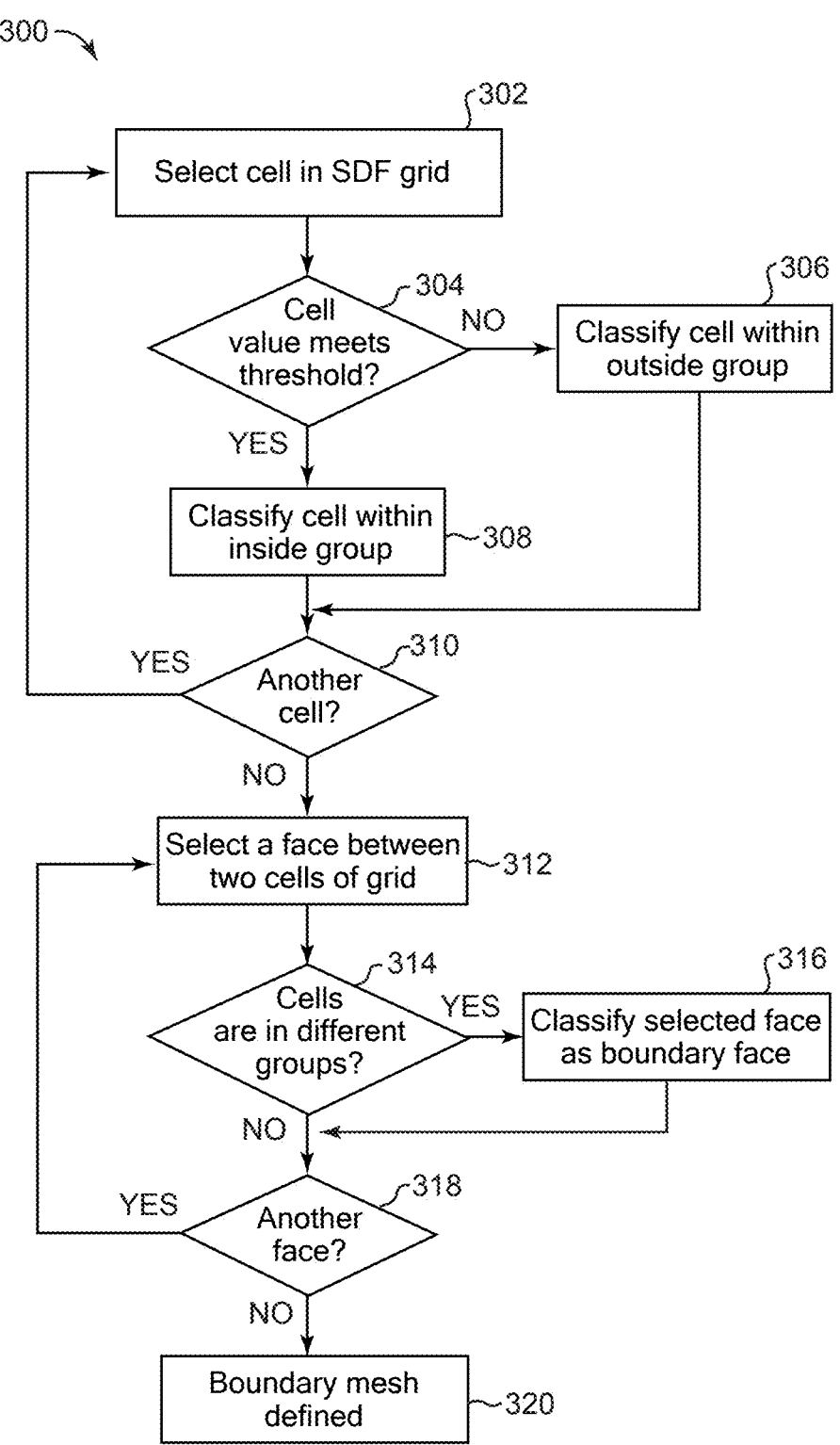
FIG. 3 is a flow diagram of an example method to determine a boundary mesh based on a boundary between groups of cells in an SDF grid, in accordance with some implementations.

FIG. 3 is a flow diagram of an example method 300 to determine a boundary mesh based on cells within a threshold distance of a surface represented in an SDF grid, according to some implementations. For example, method 300 can be an example implementation of block 204 of method 200 of FIG. 2, or can be performed independently or separately from method 200. In some implementations, method 300 can be performed, for example, on a server system and/or client system similarly as described for method 200.

Method 300 may begin at block 302. In block 302, a cell is selected in an SDF grid, e.g., the SDF grid obtained in block 202 of FIG. 2. The selected cell has not yet been processed by method 300 in a previous iteration of the current processing. The cell can be selected from any location in the SDF grid. Block 302 may be followed by block 304.

In block 304, it is determined whether the selected cell meets a threshold condition. For example, it can be determined whether the SDF value of the cell ("cell value") satisfies a particular threshold cell value condition. In some implementations, the threshold cell value condition is used to find cells that are within a threshold distance of the surface.

In some examples of a threshold cell value condition, for cells in D dimensions of the SDF grid, it can be determined whether the selected cell C has a cell value sdf(C) as follows:

$$sdf(C) \geq -\frac{\sqrt{D}}{2}$$

This condition assumes a convention that cell values are negative for points that are outside the object of the surface and are positive for points that are inside the object (in other implementations using the opposite sign convention, the above condition can have no negative sign). The square root of D divided by 2 is half of the diagonal of a cell in the dimensions of the cells. Thus, a cell having a cell value that meets this condition is considered to be a cell that is inside or near the surface (within a distance of square root of D divided by 2), and the surface is within the cell. Other or additional threshold conditions can be used in other implementations.

If the cell value does not meet the threshold condition in block 304, then the method continues to block 306, in which the selected cell is classified within an outside group of cells. The outside group of cells includes cells that are excluded from the inside group of cells, e.g., have centers that are positioned outside the object and surface by the threshold distance or more. For example, the outside group of cells can be all cells of the SDF grid except for the cells in the inside group of cells (described below). The selected cell has a center that is positioned outside the distance of the threshold condition and thus is added to this group. Block 306 may be followed by block 310, which is described below.

If the cell value meets the threshold condition in block 304, then the method continues to block 308, in which the selected cell is classified within an inside group of cells. The inside group of cells includes cells that have centers that are inside or near the surface based on the threshold condition (e.g., within the threshold distance of the surface). The selected cell has a center that is positioned inside the surface or near to the surface (e.g., within the threshold distance indicated by the threshold condition), and is added to this group. Block 308 may be followed by block 310.

In block 310, it is determined whether there is another cell in the SDF grid to process that has not yet been processed by blocks 302-308 of method 300. If there is another cell to process, the method continues to block 302 to select another cell in the SDF grid. If there are no more cells to process (e.g., all cells in the SDF grid have been processed), the method continues to block 312.

In block 312, a face is selected that is between two cells of the SDF grid. The selected face has not yet been processed by method 300, e.g., in a previous iteration of blocks 312-320. The cell face can be selected from anywhere in the SDF grid. Block 312 may be followed by block 314.

In block 314, it is determined whether the two cells surrounding the selected face are in different groups, e.g., whether one cell is in the inside group and one cell is in the outside group as determined in blocks 302-310. If the two cells are not in different groups (e.g., the cells are in the same group), then the method continues to block 318, described below. If the two cells are determined to be in different groups in block 314, then the method continues to block 316 and classifies the selected face as a boundary face. Since the face is between an inside cell and an outside cell, it is on a boundary between the groups of cells, and the boundary face is considered to be a face within the boundary mesh. Block 316 may be followed by block 318.

In block 318, it is determined whether there is another cell face to process that has not yet been processed by blocks 312-320 of method 300. If there is another face to process, the method continues to block 312 to select another face between two cells in the SDF grid. If there are no more faces to process (e.g., all faces in the SDF grid have been processed), the method continues to block 320.

In block 320, the boundary mesh is defined by the boundary faces classified in the iterations of block 316. The vertices of the boundary faces are considered to be boundary vertices of the boundary mesh.

The vertices and faces of the boundary between the inside group of cells and the outside group of cells of the SDF grid form the boundary mesh, e.g., the boundary mesh is defined as the faces and vertices where cells from the two groups of cells meet. For example, in some implementations, the boundary vertices and the boundary faces of the boundary mesh are included in particular cells of the SDF grid at which the inside group of the particular cells and the outside group of the particular cells meet, where the inside group includes cells inside the surface and cells outside the surface within a threshold distance of the surface, and the second group includes the cells of the SDF grid excluding the inside group of cells.

For example, in some implementations, the threshold condition detects the inside group of cells that the surface (and object) could potentially be touching. The cells in the inside group are not all necessarily (completely, or at all) inside the surface (e.g., inside the object having the surface), but are inside the generated boundary mesh. This causes all features of the surface (e.g., object) to be encompassed by the boundary mesh topology. All other cells outside the inside group can be considered to be in the outside group of cells.

In some implementations, the positions of the boundary vertices of the boundary mesh are at all corners of the SDF grid where, out of all the $2^D$ cells neighboring (adjacent to) each corner, at least one cell is in the inside group and at least one cell is in the outside group. This defines a blocky outline mesh that encompasses the surface or object. These positions of the boundary vertices are displaced in block 208 of FIG. 2, examples of which are described below with respect to FIG. 6, to determine a final mesh shape.

Prior techniques fail to extract sub-cell features because they place a mesh only between cells that have different signs of the SDF grid (e.g., a cell whose center is inside and a cell whose center is outside the surface or object). Unlike meshes generated by techniques disclosed herein, such a generated mesh of prior techniques does not include object features that are positioned so that no cell centers are positioned inside those features.

Blocks of method 300 may be performed sequentially or at least partially in parallel. For example, in some implementations, blocks 302-310 may process multiple cells of the grid in parallel to classify the cells, blocks 312-318 may process multiple faces of the grid in parallel to classify boundary faces, and/or multiple cells and faces of the grid may be classified at least partially in parallel.

FIG. 4 is a flow diagram of an example method 400 to determine offset cell positions for cells neighboring a boundary mesh, according to some implementations. For example, method 400 can be an implementation of block 206 of method 200 of FIG. 2, or can be performed independently or separately from method 200. In some implementations, method 400 can be performed, for example, on a server system and/or client system similarly as described for method 200.

Method 400 may begin at block 402. In block 402, boundary cells are determined in the SDF grid. Boundary cells, for the purposes of method 400, are cells that are within a threshold distance of the surface. In some implementations, the cell value of each cell is compared to a threshold cell value to determine whether the cell is within the threshold distance of the surface. For example, a cell can be within the threshold distance if the following condition is met:

$$|sdf(V_C)| \leq \sqrt{D}$$

Thus, if the cell value is less than or equal to the square root of D, where D is the number of dimensions of the grid, then the cell qualifies as a boundary cell that is sufficiently close to the boundary to be processed by method 400. Cells that do not qualify can be considered too far from the boundary and their gradients (see below) can be considered too imprecise. Other threshold conditions or distances can be used in other implementations. In some implementations, all (or a subset of) the cells of the SDF grid can be examined to find the set of boundary cells. In various example implementations, multiple boundary cells can be determined before processing the cells via the other blocks of method 400, or a single cell can be examined and, if it is determined to be a boundary cell, processed in the other blocks of method 400, then another cell examined and processed (if appropriate), and so on.

In some implementations, one or more additional or alternate threshold conditions can be used to determine whether a cell is a boundary cell. For example, it can be determined whether each cell is within the threshold distance of the surface as described above, and whether the cell neighbors a boundary vertex in the boundary mesh determined in block 204 of method 200, in some implementations, a cell that meets both conditions is considered to be a boundary cell. Block 402 may be followed by block 404.

In block 404, a boundary cell is selected that has not yet been processed by method 400 in the current processing. For example, one of the cells determined in block 402 can be selected. In some implementations, any (unprocessed) cell of the SDF grid can be selected, and if it meets the threshold condition of block 402, it is selected. In some implementations, any (unprocessed) cell of the SDF grid can be selected without use of a threshold condition. Block 404 may be followed by block 406.

In block 406, corner gradients are determined at corners of the selected cell based on values of neighboring cells. In some implementations, the corner gradients of the selected cell are determined using a particular technique. For example, a Robert's cross technique (or similar) can be used, in which the difference between values of two cells that are diagonal across one vertex is used to determine the value of the gradient across that diagonal direction.

FIG. 5 is an illustration of an example portion of an SDF grid and cells that can be used in determining a corner vector, in accordance with some implementations. An example portion of an SDF grid 500 shows four cells C00, C10, C01, and C11 around a vertex V in a two-dimensional grid. In this example, the subtractions of C11-C00 and C10-C01 can be made to obtain the components of the gradient in the position of vertex V along the two diagonal directions. These operations provide an off-axis (rotated) gradient vector that is rotated back into a canonical coordinate system via a matrix transform so that it is no longer off-axis, yielding a gradient vector G as shown below (for two dimensions):

$$G = \begin{bmatrix} \dfrac{C_{11} + C_{10} - C_{00} - C_{01}}{2} \\ \dfrac{C_{11} + C_{01} - C_{00} - C_{10}}{2} \end{bmatrix}$$

This approach can be extended to D dimensions, yielding a vector $[g_0, g_1, \ldots, g_{D-1}]^T$ that represents the field gradient in the corner vertex (T indicates that this is a transposed column vector). The gradient value $g_i$ is as follows:

$$g_i = \frac{g_{i+} - g_{i-}}{2^{D-1}}$$

This value is the gradient value along each axis, where $g_{i+}$ and $g_{i-}$ are the sums of all cell values on the positive side and negative side, respectively, of the vertex along that axis.

For example, in some implementations, in three dimensions the discrete gradient in a corner of a cell can be represented as follows:

$$G = \begin{bmatrix} \dfrac{(C_{100} + C_{101} + C_{110} + C_{111}) - (C_{000} + C_{001} + C_{010} + C_{011})}{4} \\ \dfrac{(C_{010} + C_{011} + C_{110} + C_{111}) - (C_{000} + C_{001} + C_{100} + C_{101})}{4} \\ \dfrac{(C_{001} + C_{001} + C_{101} + C_{111}) - (C_{000} + C_{010} + C_{100} + C_{110})}{4} \end{bmatrix}$$

The above equation calculates the value of the gradient in a corner between 2D cells in a manner equivalent to a finite differences scheme, thus approximating the real gradient $\nabla sdf(V)=1$ of the underlying idealized continuous field.

A gradient can be determined for each corner of the selected cell using the above equation for gradient G (e.g., where for each corner of the selected cell, the center vertex V in the above equations is the corner. Thus, when calculating each gradient, the cell value of the selected cell and the cell values of $3^D-1$ neighboring cells are used.

Referring back to FIG. 4, block 406 may be followed by block 408. In block 408, invalid corner gradients (if present) are detected for the determined corner gradients based on a detection sensitivity value. One or more corner gradients determined in block 406 may be invalid due to small features being present between cell centers. For example, an ideal gradient on a correct SDF field should satisfy the Eikonal equation $\nabla sdf(V)=1$ for all points V. The Eikonal equation may not hold for all points in discrete SDF fields, because a small feature of the object or surface may be present between two cell centers of the SDF field, such that signed distance values of those cells are from different sides of the surface or object. Thus it may be incorrect to subtract such cell values from one another in such a finite difference calculation.

The described techniques can be performed to detect cases of small features being present between cell centers such that cell values are from different sides of the surface. When a gradient is calculated by differentiating two neighboring cells, the gradient should have the same directions crossing those two cells, but if the direction flips between those cells, then a cell value may be invalid. Thus, corner gradients are examined to determine whether they are invalid, which indicates that a surface or portion of the object is between the cell centers crossed by the corner gradient.

In some implementations, gradient length checking can be used to determine invalid gradients. For example, an epsilon value & can be used that determines a detection sensitivity threshold to detect invalid gradients. For example, all gradients where $\||G|-1|>\varepsilon$ can be classified as invalid gradients, where |G| is the length of the gradient. This formula effectively determines how close the gradient length is to 1; if the length is too far from 1 (based on the epsilon value), the gradient is considered invalid. Some example values of epsilon can be between 0.1 and 0.5, or any value $0<\varepsilon<1$ depending on numeric precision, reliability of SDF grid data and surface data, number of dimensions, etc. For example, epsilon can be set to a higher value to obtain sharper mesh outlines or a lower value to obtain "blurrier" mesh outlines (e.g., a rounded mesh outline around a sharp object corner).

Each corner gradient determined for the selected cell can be compared to the detection sensitivity threshold $\varepsilon$ to determine if it is an invalid gradient. Block 408 may be followed by block 410.

In block 410, the invalid corner gradients determined in block 408 (if any) are corrected. To determine a corrected corner gradient, the cell values of neighboring cells that were used in the gradient calculations of an invalid gradient are modified. For example, it can be determined that those neighboring cells are valid if they contributed to a corner gradient that has been determined to be valid (e.g., used in a gradient calculation for a corner gradient that is not determined invalid in block 408). Neighboring cells used only in the determination of invalid corner gradients are considered to be invalid (e.g., neighboring cells that are used in the determination of at least one valid gradient can be considered valid).

The cell values of the invalid cells are corrected using any of multiple techniques. In some implementations, the invalid cell values can be corrected using an SDF extrapolation method, such as the Godunov upwind difference scheme, to calculate the values of all invalid cells from the valid cells in the $3^D$ neighborhood of the invalid gradient (e.g., reconstruct the invalid cell values using known cell values). In some implementations, the invalid cell values can be set to zero to correct them. The latter technique is faster and may have small added imprecision, but may be sufficiently accurate in many cases.

The invalid corner gradients are then recalculated using the equation described above using the corrected cell values, to provide corrected corner gradients. For example, in some implementations, the corrected cell values allow generation of a local SDF function that is continuously smooth, so that the corner gradient is corrected. Block 410 may be followed by block 412.

In block 412, the corner gradients, including corrected corner gradients, are averaged to determine a compensated center gradient at the center of the selected cell. For example, the compensated center gradient ($G_C$) is calculated in the center of the selected cell as an average of all $2^D$ corner gradients, that have been corrected as described above. The center gradient is determined since the cell value of each cell refers to the cell center. Block 412 may be followed by block 414.

In block 414, an offset cell position ($V_{CO}$) is determined. The offset cell position is (approximately) a point on the surface that is closest to the selected cell. It can be considered a best available approximation in a gradient descent search for the zero of the SDF function. In some implementations, the offset cell position is determined based the center of the selected cell, the cell value of the selected cell, and the corrected center gradient. For example, the offset cell position $V_{CO}$ can be determined as follows:

$$V_{CO} = V_C - sdf(V_C) \cdot G_C$$

where $V_C$ is the center of the selected cell, $sdf(V_C)$ is the cell (SDF) value of the selected cell, and $G_C$ is the compensated gradient in the center of the selected cell. Block 414 may be followed by block 416.

In block 416, it is determined whether there is another boundary cell to process in method 400. If there is another boundary cell to process, the method continues to block 404 to select another boundary cell that has not yet been processed. If there are no boundary cells to process (e.g., all boundary cells have been processed), the method continues to block 418. In block 418, the offset cell positions for the boundary mesh have been determined and can be used to determine displaced boundary vertices in an adjusted mesh as described below.

Blocks of method 400 may be performed sequentially or at least partially in parallel. In some implementations, blocks 404-416 may process multiple cells of the grid at least partially simultaneously. In some implementations, each selected cell is processed by method 400 of FIG. 4 and then by next block 208 of method 200 prior to the next cell being selected and processed by method 400.

FIG. 6 is a flow diagram of an example method 600 to select points for an adjusted mesh that are displaced boundary vertices, where the points are based on offset cell positions, according to some implementations. For example, method 600 can be an example implementation of block 208 of method 200 of FIG. 2, or can be performed independently or separately from method 200. In some implementations, method 600 can be performed, for example, on a server system and/or client system similarly as described for method 200.

Method 600 may begin at block 602. In block 602, a boundary vertex of the boundary mesh is selected. For example, the selected boundary vertex has not yet been processed by method 600, e.g., in a previous iteration of the current processing. The boundary mesh can be provided from block 204 of FIG. 2, for example. Block 602 may be followed by block 604.

In block 604, a set of neighboring cells of the selected boundary vertex are determined, where the neighboring cells in the set have offset cell positions. For example, the offset cell positions can be determined in block 206 of method 200 of FIG. 2. The neighboring cells in the set are within the group of $2^D$ cells around the selected boundary vertex. Neighboring cells of the selected boundary vertex that do not have associated offset cell positions are not included in the set. For example, only some of the neighboring cells of the selected boundary vertex may have had offset cell positions determined, such as cells that were within a threshold distance of a surface (and/or that neighbor a boundary vertex) as described for method 400. Block 604 may be followed by block 606.

In block 606, features of the neighboring cells in the set are determined, where the features lie on a boundary of a hypercube formed by the centers of the neighboring cells. The features can be faces (e.g., quads or triangles), lines, or points. For example, there may be between 1 and $2^D$ cells around the selected boundary vertex, and the center positions of these cells are on a D-dimensional hypercube that surrounds the selected boundary vertex. For example, the hypercube is a square in a 2D grid, and is a cube in a 3D grid. Depending on the number of the neighboring cells and their positions, the hypercube can include one or more features that have D−1 or fewer dimensions, such as faces, lines, and points. For example, in a 3D grid where the hypercube is a cube, the features can be faces, lines and points, while in a 2D grid where the hypercube is a square, the features can be lines and points. In some implementations, any formed lines and faces that cut diagonally across the hypercube are not considered, and only those that lie on the boundary of the hypercube are considered. Block 606 may be followed by block 608.

In block 608, the features determined in block 606 are displaced based on the offset cell positions of the cell centers of the neighboring cells in the set. For example, a point of the hypercube is the center of a neighboring cell and is offset or displaced to the offset cell position of that cell center. A line of the hypercube that is connected between two cell centers is displaced such that the line is connected between the offset cell positions of those two cell centers. A face of the hypercube extends between three or more cell centers and is displaced such that it extends between the offset cell positions of those three or more cell centers. Block 608 may be followed by block 610.

In block 610, for each displaced feature of block 608, a point on the feature closest to the boundary vertex is determined. For example, if the feature is a point, the closest point is the point itself. If the feature is a line, a point on the line that is closest to the boundary vertex is determined. If the feature is a face (e.g., triangle or quad), a point on the face that is the closest to the boundary vertex is determined. For example, standard mathematical methods can be used to find the closest point on a line segment, closest point on a triangle, etc. Block 610 may be followed by block 612.

In block 612, a particular point is selected from the closest points determined for the displaced features in block 610, where the particular point is the closest of those points to the selected boundary vertex. This particular closest point provides an approximate closest point to the surface for the selected boundary vertex, and is the final position for that boundary vertex as a vertex in the output (adjusted) mesh. Thus, the boundary vertex is displaced to the position of the particular point. Block 612 may be followed by block 614.

In block 614, it is determined whether there is another boundary vertex to process, of the boundary vertices of the boundary mesh. If there is another boundary vertex to process, the method continues to block 602 to select another (unprocessed) boundary vertex. If there are no more boundary vertices to process, the method continues to block 616, in which the particular points determined in block 612 are provided to be used as vertices of an adjusted mesh as described above with reference to method 200 of FIG. 2.

Blocks of method 600 may be performed sequentially or at least partially in parallel. In some implementations, blocks 602-614 may process multiple boundary vertices at least partially simultaneously.

In various implementations, various blocks of methods 200, 300, 400, and 600 may be combined, split into multiple blocks, performed in parallel, or performed asynchronously. In some implementations, one or more blocks of these methods may not be performed or may be performed in a different order than shown in these figures. Methods 200, 300, 400, and 600, or portions thereof, may be repeated any number of times using additional inputs.

Figure 7A:
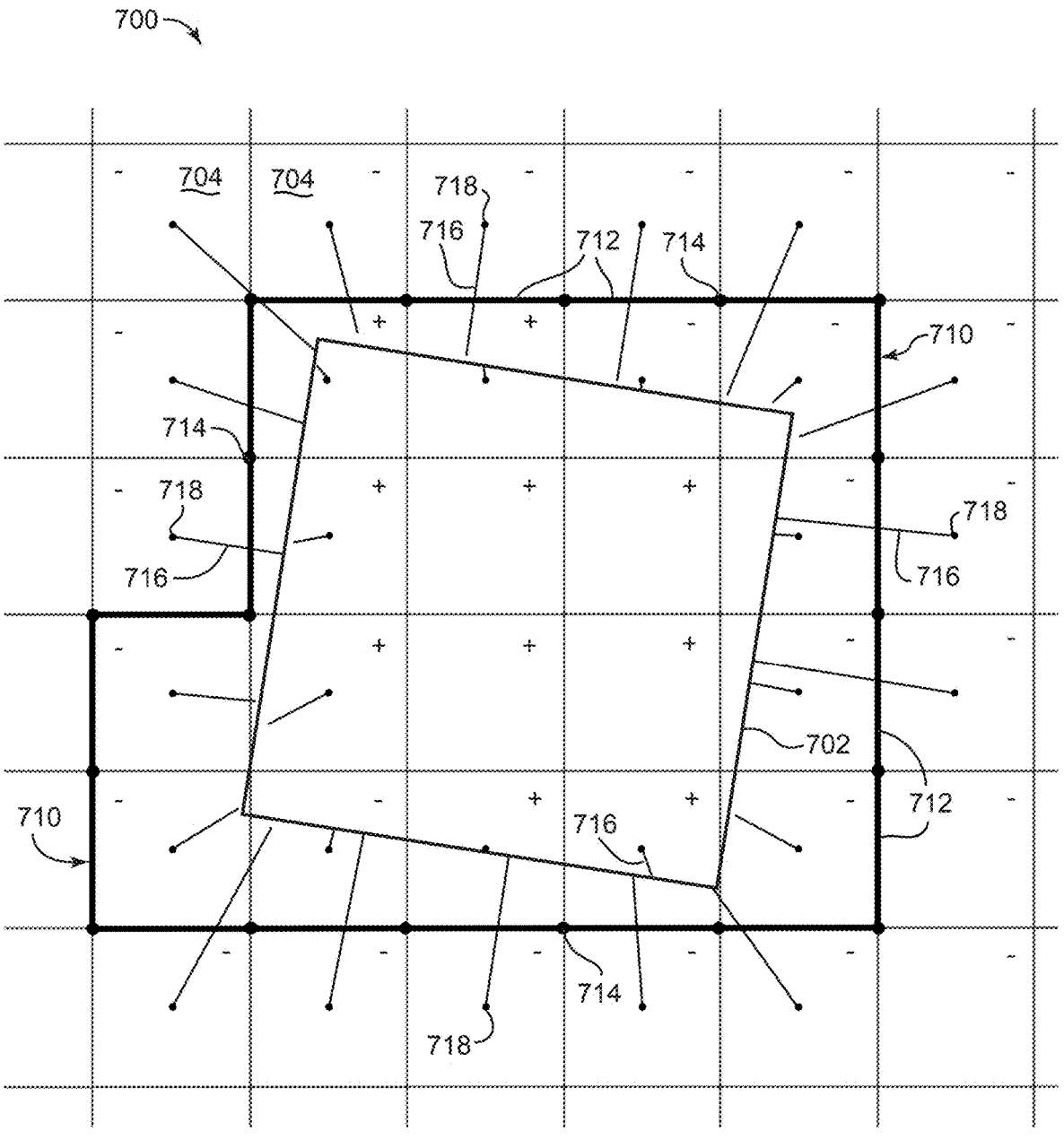
FIGS. 7A, 7B, and 7C are diagrammatic illustrations of an example SDF grid approximating an object and showing features of methods described herein to determine a mesh for the object, in accordance with some implementations.
Figure 7B:
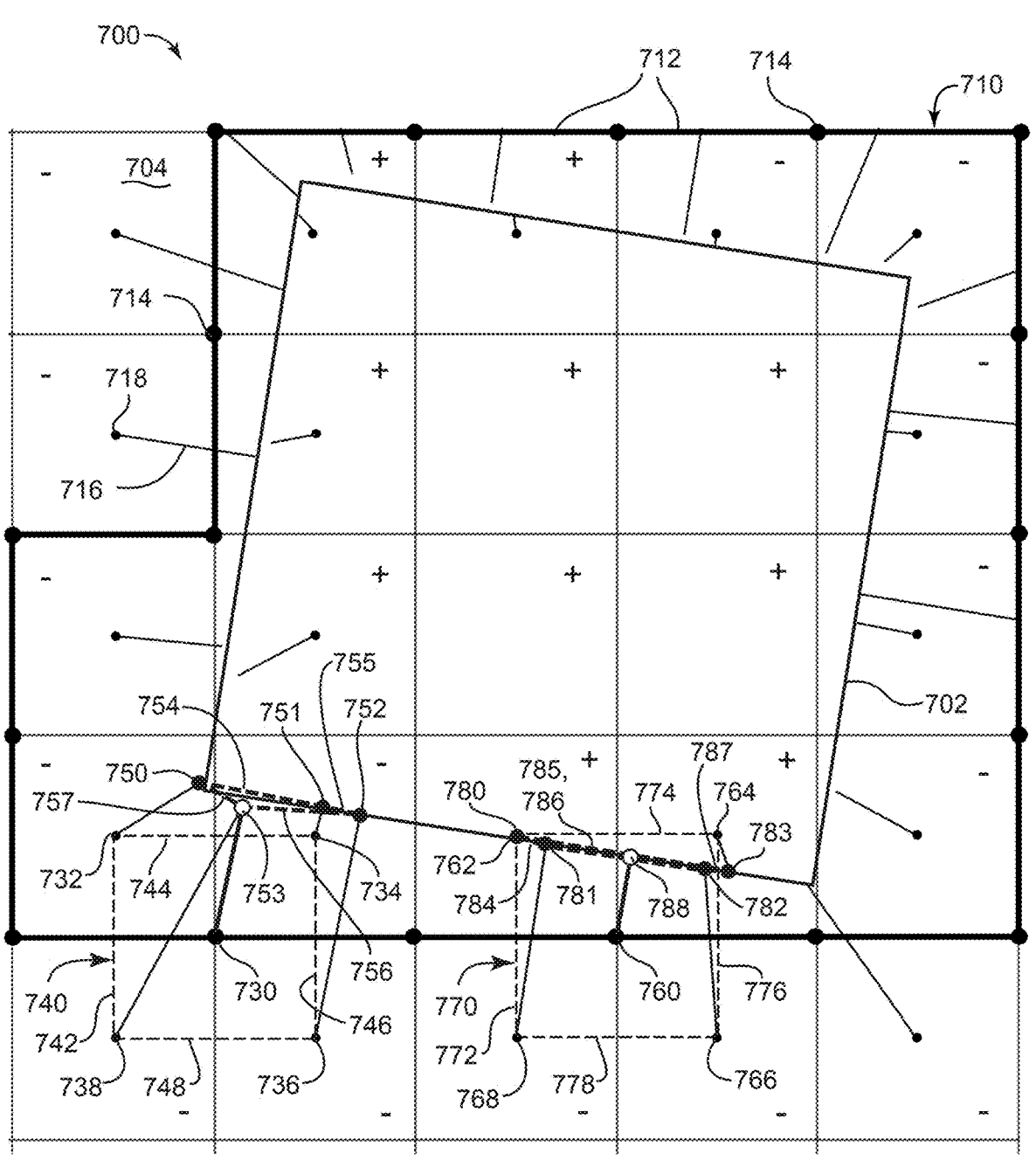
Figure 7C:
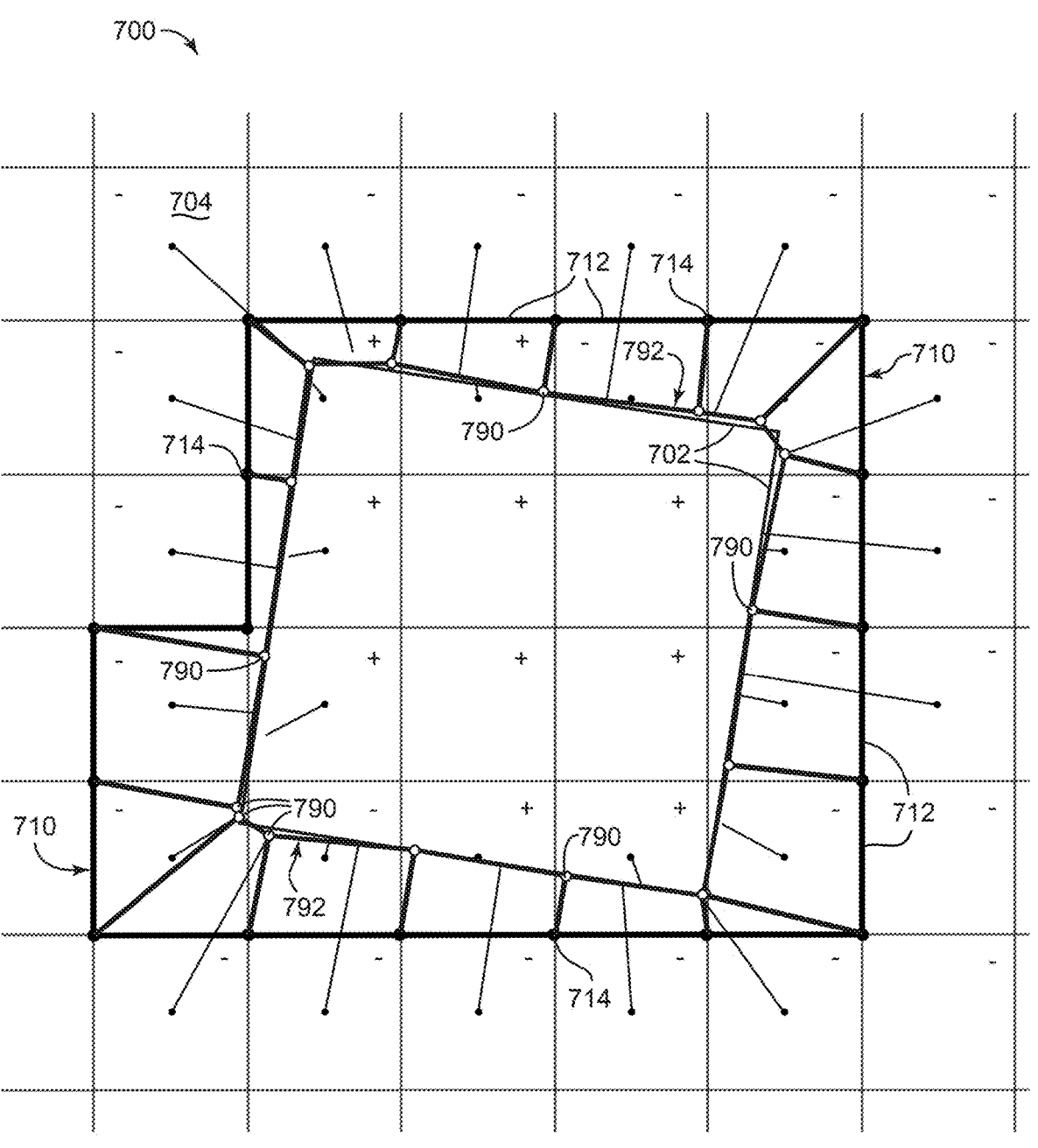

FIGS. 7A, 7B, and 7C are diagrammatic illustrations of an example SDF grid 700 approximating an object and showing features of methods described herein to determine a mesh for the object, in accordance with some implementations.

In FIG. 7A, a boundary mesh and offset cell positions are determined for the object. A 2D square object 702 is shown as the original object (ground truth) that is approximated by cells 704 of 2D SDF grid 700. Each cell 704 has a cell value (not shown) based on the (closest) distance from the center of the cell to the surface of the object for the magnitude of the signed cell value, and has a sign based on whether the center of the cell is outside the object (negative) or inside the object (positive). The sign of the cell value is shown as a "+" (positive) and "−" (negative) symbol within the cell in FIG. 7A.

A boundary mesh 710 has been determined as described above with respect to block 204 of FIG. 2. Boundary mesh 710 includes boundary faces 712 (which are boundary lines in this 2D example) and boundary vertices 714 at the corners of particular cells 704. For example, an inside group of cells is detected based on the centers of cells having cell values with magnitudes greater than the threshold cell value, e.g., having centers inside the object 702, or having centers outside the object and within a threshold distance to the object. Boundary faces 712 are detected to be positioned between the inside group of cells and an outside group of cells as described with reference to FIG. 3.

Cell offsets 716 are also shown as lines extending from centers 718 of boundary cells in grid 700 of FIG. 7. These lines end at offset cell positions that are determined as described with reference to block 206 of FIG. 2 and FIG. 4. For example, in some implementations, the boundary cells are determined based on their centers being within a particular threshold distance of the surface of the object, and corner gradients are determined for the boundary cells based on cell values of neighboring cells. Invalid corner gradients are corrected and an averaged center gradient is determined, and the offset cell position is determined based on the center gradient. As shown, the offset cell positions are displaced centers that are near the surface of the object 702.

In FIG. 7B, displaced features of grid cells of SDF grid 700 are used to determine points closest to the surface of the object as displaced boundary vertices, according to some implementations. In the example of FIG. 7B, the method of FIG. 6 is implemented to determine points closest to the surface.

In an example, a boundary vertex 730 of boundary mesh 710 is selected, and cell centers 732, 734, 736, and 738 are the centers of the set of neighboring cells that have offset cell positions determined as in FIG. 7A. A hypercube 740 is formed around these cell centers, which is a square in this 2D example, and features of the hypercube are determined, which are points at cell centers 732, 734, 736, and 738 and lines 742, 744, 746, and 748. These features are displaced to the offset cell positions of the cell centers, such that the displaced features are points 750, 751, 752, and 753 and lines 754, 755, 756, and 757.

A point closest to the boundary vertex 730 is determined on each of the displaced features, and of these points, the point closest to the boundary vertex 730 is selected. For the features that are points 750, 751, 752, and 753 and lines 754, 755, 756, and 757, the point 753 is determined to be closest to boundary vertex 730. The boundary vertex 730 is thus displaced to the position of point 753 as a vertex of the generated mesh.

In another example, a boundary vertex 760 is selected, and cell centers 762, 764, 766, and 768 are centers of the set of neighboring cells that have offset cell positions. A hypercube 770 is formed around these cell centers and features of the hypercube are determined, which are points at cell centers 762, 764, 766, and 768 and lines 772, 774, 776, and 778. These features are displaced to the offset cell positions of the cell centers, such that the displaced features are points 780, 781, 782, and 783 and lines 784, 785, 786, and 787.

A point closest to the boundary vertex 760 is determined on each of the displaced features, and of these points, the point closest to the boundary vertex 760 is selected. For the features that are points 780, 781, 782, and 783 and lines 784, 785, 786, and 787, the point 788 is determined to be closest to boundary vertex 760. Point 788 is a point on a line feature (line 786) that is the closest point on any of these features to the boundary vertex 760. The boundary vertex 760 is thus displaced to the position of point 788 as a vertex of the generated mesh.

A similar process is implemented to determine points of displacement for all the boundary vertices of boundary mesh 710.

In FIG. 7C, the closest points (displaced boundary vertices) found in FIG. 7B are used as the vertices of an adjusted mesh, according to some implementations. In the example of FIG. 7C, the closest points on the displaced features of the hypercubes to the associated boundary vertices are shown as new vertices 790 that are displaced boundary vertices as indicated by the lines connecting the new vertices to the associated original boundary vertices. For example, vertices 790 are at points 753 and 788 shown in FIG. 7B, as well as other positions determined for the other qualifying boundary vertices 714 of boundary mesh 710. The vertices 790 are connected to each other with lines as shown to form adjusted mesh 792. Adjusted mesh 792 follows the shape original object 702 closely, including at most corners of the original object.

Figure 8:
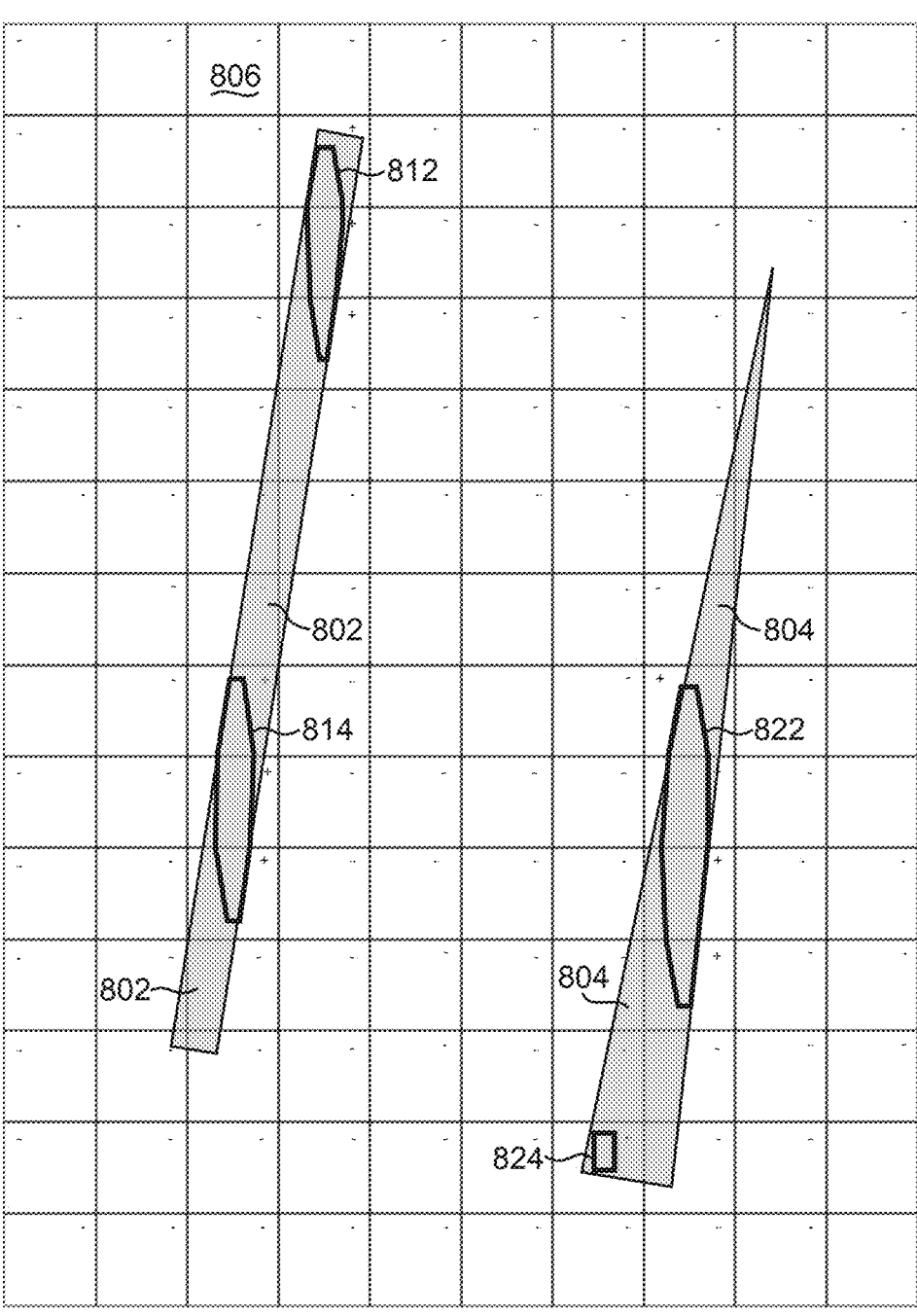
FIG. 8 is a diagrammatic illustration of an example SDF grid in which mesh outlines are generated for objects based on a prior technique, in accordance with some implementations.

FIG. 8 is a diagrammatic illustration of an example SDF grid 800 in which mesh outlines are generated for objects based on a prior technique, in accordance with some implementations. In this example, objects 802 and 804 are the original objects (ground truth) that are approximated by SDF grid 800 having cells 806, where each cell 806 has a cell value (not shown) based on the (closest) distance of the center of the cell to the surface of the object for the magnitude of the signed cell value, and has a sign based on whether the center of the cell is outside the object (negative) or inside the object (positive). The sign of the cell value is shown as a "+" (positive) and "−" (negative) symbol in the cells in FIG. 8.

A mesh has been generated for object 802 based on a prior mesh generation technique, and this mesh has two mesh outlines 812 and 814. Similarly, a mesh has been generated for object 804 based on the prior technique, and this mesh has two mesh outlines 822 and 824.

As shown, mesh outlines 812, 814, 822, and 824 do not resemble the original objects 802 and 804 that the outlines are intended to approximate. Large portions of objects 802 and 804 have not been detected by the implemented mesh generation technique, e.g., due to these portions being located between the centers of cells of the grid 800. For example, outlines 812, 814, 822, and 824 are generated in cells in which the objects 802 and 804 cover the cell centers. Portions of objects 802 and 804 that do not cover cell centers do not appear in the SDF grid because the signs of the cell values surrounding these portions do not indicate a surface is present (e.g., the cell values surrounding these portions are negative). The prior techniques used in this example thus generate inaccurate meshes for many thin and/or small objects or features of objects.

Figure 9:
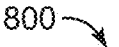
FIG. 9 is a diagrammatic illustration of the example SDF grid of FIG. 8 in which mesh outlines are generated for the objects based on techniques described herein, in accordance with some implementations.

FIG. 9 is a diagrammatic illustration of the example SDF grid 800 of FIG. 8 in which mesh outlines are generated for the objects based on techniques described herein, in accordance with some implementations. Similarly as shown in FIG. 8, objects 802 and 804 are the original objects (ground truth) approximated by the SDF grid.

A mesh has been generated from SDF grid 800 to approximate object 802 based on one or more techniques described herein, e.g., based on method 200 of FIG. 2. The mesh includes a mesh outline 902 that is generated for the object 802. Another mesh outline 904 has been similarly generated for object 804.

As shown, the mesh outlines 902 and 904 closely correspond to the shapes of objects 802 and 804, respectively. Outlines 902 and 904 include almost the entirety of the objects they are approximating, with minor deviations from the original corners of the objects. Thus, described techniques can detect the portions of objects 802 and 804 that do not cover cell centers, and can provide a more accurate mesh outline for small, thin, and/or sharp objects and object features.

Additional example implementations of one or more features described herein can include the following. The techniques described herein for determining offset positions of cell centers (e.g., block 206 of FIG. 2) can be used in other methods that use an SDF grid, e.g., to find points on a surface that are closest to cell centers. Methods can use the determination of gradients described for method 400 of FIG. 4 to determine accurate and consistent gradients in an SDF grid (e.g., to capture the continuity of a surface function accurately). In various implementations, the gradients determined as described herein can be used for up-sampling or down-sampling a mesh of an SDF grid, and/or to determine noise applied to a mesh, or to determine other signal processing for a mesh and SDF grid.

FIG. 10 is a block diagram of an example computing device 1000 which may be used to implement one or more features described herein, in accordance with some implementations. In one example, device 1000 may be used to implement a computer device (e.g., 72, 110, and/or 116 of FIG. 1), and perform appropriate method implementations described herein. Computing device 1000 can be any suitable computer system, server, or other electronic or hardware device. For example, the computing device 1000 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 1000 includes a processor 1002, a memory 1004, input/output (I/O) interface 1006, and audio/video input/output devices 1014 (e.g., display screen, touchscreen, display goggles or glasses, audio speakers, microphone, etc.).

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1008, an object display engine 1010, and associated data 1012. In some implementations, object display engine 1010 (and/or other engines) can include instructions that enable processor 1002 to perform functions described herein, e.g., some or all the methods and implementations of FIGS. 2-6. In various implementations, some or all the methods of FIGS. 2-4 and 6 can be implemented on one or more devices 1000, e.g., on one or more processors of each of the one or more devices 1000.

For example, memory 1004 can include software instructions for mesh generation engine 1010 that can generate meshes from SDF grids and provide the meshes for use by device 1000 or for an online metaverse platform 102 or other device or system, e.g., storing, modifying, and/or rendering the meshes for display by a display device of I/O devices 1014. Any of software in memory 1004 can alternatively be stored on any other suitable storage location or computer-readable medium. Various engines, modules, instructions, machine learning models, software code, and other blocks used in described features can be stored in memory 1004 and/or other connected storage devices (e.g., database 1012). For example, memory 1004 and/or database 1012 can store data and engines for use by and output by mesh generation engine 1010, including SDF grid data (e.g., signed cell values), mesh data (e.g., vertices, offset cell positions, etc.), other data used herein, etc. Other engines and models can also be stored in memory 1004. Memory 1004 and database 1012 (and/or other connected storage device(s)) can store instructions and data used in the features described herein. Memory 1004 and any other type of storage (magnetic disk, optical disk, magnetic tape, or other tangible media) can be considered "storage" or "storage devices."

I/O interface 1006 can provide functions to enable interfacing the server device 1000 with other systems and devices. For example, network communication devices, storage devices (e.g., memory and/or data store 108), and input/output devices can communicate via interface 1006. In some implementations, the I/O interface can connect to interface devices including input devices (keyboard, game-pad or other game controller, pointing device, touchscreen, microphone, camera, scanner, etc.) and/or output devices (display device, speaker devices, printer, motor, etc.). For example, meshes generated by the online platform 1202 (and/or digital objects and digital features derived there-from) can be stored at the platform 1202 and also sent over a network to one or more client devices for storage and display by the client devices.

For ease of illustration, FIG. 10 shows one block for each of processor 1002, memory 1004, I/O interface 1006, soft-ware blocks 1008 and 1010, and database 1012. These blocks may represent one or more processors or processing circuitries, operating systems, memories, I/O interfaces, applications, and/or software modules. In other implemen-tations, device 1000 may not have all of the components shown and/or may have other elements including other types of elements instead of, or in addition to, those shown herein. While the online metaverse platform 102 may be described as performing operations as described in some implemen-tations herein, any suitable component or combination of components of online metaverse platform 102 or similar system, or any suitable processor or processors associated with such a system, may perform the operations described.

A user device can also implement and/or be used with features described herein, e.g., client devices 110 and 116. Example user devices can be computer devices including some similar components as the device 1000, e.g., processor(s) 1002, memory 1004, and I/O interface 1006. An operating system, software and applications suitable for the client device can be provided in memory and used by the processor. T/he I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 1014, for example, can be connected to (or included in) the device 1000 to display images pre- and post-processing as described herein, where such display device can include any suitable display device, e.g., an LCD, LED, or plasma display screen, CRT, television, monitor, touchscreen, 3-D display screen, headset, projector, or other visual display device. Some implementations can provide an audio output device, e.g., voice output or synthesis that speaks text. For example, such display devices or output devices can display objects (including one or more surfaces or other character-istics/features) in a virtual environment that are based on meshes generated by mesh generation engine 1010.

The methods, blocks, and/or operations described herein can be performed in a different order than shown or described, and/or performed simultaneously (partially or completely) with other blocks or operations, where appro-priate. Some blocks or operations can be performed for one portion of data and later performed again, e.g., for another portion of data. Not all the described blocks and operations need be performed in various implementations. In some implementations, blocks and operations can be performed multiple times, in a different order, and/or at different times in the methods.

In some implementations, some or all the methods can be implemented on a system such as one or more client devices. In some implementations, one or more methods described herein can be implemented, for example, on a server system, and/or on both a server system and a client system. In some implementations, different components of one or more serv-ers and/or clients can perform different blocks, operations, or other parts of the methods.

One or more methods described herein (e.g., methods 200, 300, 400, and/or 600) can be implemented by computer program instructions or code, which can be executed on a computer. For example, the code can be implemented by one or more digital processors (e.g., microprocessors or other processing circuitry), and can be stored on a computer program product including a non-transitory computer read-able medium (e.g., storage medium), e.g., a magnetic, opti-cal, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) deliv-ered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of comput-ing device, a program run on a web browser, a mobile application ("app") executing on a client device such as a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a client device sends user input data to a server device and receives from the server the final output data for output (e.g., for display). In another example, all computa-tions can be performed within the client device. In another example, computations can be split between the client device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different com-binations of systems, devices, and functional blocks as would be known to those skilled in the art. Any suitable programming language and programming techniques may be used to implement the routines of particular implemen-tations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:

obtaining a signed distance field (SDF) grid that includes a plurality of cells, wherein the cells of the SDF grid include cell values that indicate distances of the cells to a surface that the SDF grid encompasses, the surface distinguishing an inside and an outside of an object;

determining, by one or more processors, a boundary mesh having boundary vertices and boundary faces of particular cells in the SDF grid that are based at least on cells that are within a threshold distance of the surface;

determining, by the one or more processors, offset cell positions for centers of neighboring cells that neighbor the boundary mesh, wherein the offset cell positions are based on corner gradients of the neighboring cells; and generating, by the one or more processors, an adjusted mesh that approximates the surface, wherein the adjusted mesh is defined by mesh vertices that are based on the boundary vertices of the boundary mesh that are displaced based on the offset cell positions.

2. The computer-implemented method of claim 1, wherein the boundary vertices and the boundary faces of the particular cells have positions in the SDF grid based on a boundary between a first group of cells inside or within a threshold distance of the surface and a second group of cells that includes other cells of the plurality of cells excluding the first group of cells.

3. The computer-implemented method of claim 1, wherein each offset cell position is based on a center of a respective cell, a cell value of the respective cell, and a compensated gradient that indicates a direction and magnitude of maximum change of the center of the respective cell toward the surface, wherein the compensated gradient is based on corner gradients of the respective cell.

4. The computer-implemented method of claim 1, wherein the corner gradients include at least one corrected corner gradient that is corrected from at least one invalid corner gradient.

5. The computer-implemented method of claim 4, wherein the at least one invalid corner gradient is detected based on comparing at least one of the corner gradients to a detection sensitivity value.

6. The computer-implemented method of claim 4, wherein the at least one invalid corner gradient is caused by a portion of the object being positioned between cell centers of two adjacent cells in the SDF grid such that no cell centers are positioned inside the portion of the object.

7. The computer-implemented method of claim 1, wherein determining the offset cell positions includes, for each cell of a set of cells of the SDF grid:

determining, by the one or more processors, the corner gradients at corners of the cell, wherein the corner gradients are based on cell values of the cell and neighboring cells to the cell;

detecting, by the one or more processors, that at least one of the corner gradients of the cell is an invalid corner gradient by comparing the at least one corner gradient to a detection sensitivity value;

correcting, by the one or more processors, the invalid corner gradient to provide a corrected corner gradient;

determining, by the one or more processors, a compensated gradient for a center of the cell based on the corner gradients including the corrected corner gradient for the cell; and determining, by the one or more processors, an offset cell position for the cell, the offset cell position being a point approximately on the surface that is closest to the center of the cell, wherein the offset cell position is based on the center of the cell, the cell value of the cell, and the compensated gradient.

8. The computer-implemented method of claim 7, wherein the set of cells only includes cells that each have a center located within a particular distance of an associated boundary vertex of the boundary mesh.

9. The computer-implemented method of claim 7, wherein correcting the invalid corner gradient includes:

correcting the cell values in neighboring cells that contributed to the invalid corner gradient; and recalculating the invalid corner gradient using the corrected cell values to obtain the corrected corner gradient.

10. The computer-implemented method of claim 1, further comprising, after determining the offset cell positions:

for each boundary vertex of the boundary mesh, selecting a point based on the offset cell positions of neighboring cells of the boundary vertex, wherein the mesh vertices of the adjusted mesh are the selected points.

11. The computer-implemented method of claim 10, wherein the point is closest to the boundary vertex of a plurality of points on displaced features based on the offset cell positions of the one or more neighboring cells of the boundary vertex.

12. The computer-implemented method of claim 1, further comprising generating, by the one or more processors, an object surface based on the adjusted mesh, the object surface displayable by a display device.

13. A system comprising:

at least one processor; and a memory coupled to the at least one processor, with software instructions stored thereon that, when executed by the at least one processor, cause the at least one processor to perform operations including:

obtaining a signed distance field (SDF) grid that includes a plurality of cells, wherein the cells of the SDF grid include cell values that indicate distances of the cells to a surface that the SDF grid encompasses, the surface distinguishing an inside and an outside of an object;

determining a boundary mesh having boundary vertices and boundary faces of particular cells in the SDF grid that are based at least on cells that are within a threshold distance of the surface;

determining offset cell positions for centers of neighboring cells that neighbor the boundary mesh, wherein the offset cell positions are based on corner gradients of the neighboring cells; and generating an adjusted mesh that approximates the surface, wherein the adjusted mesh is defined by mesh vertices that are based on the boundary vertices of the boundary mesh that are displaced based on the offset cell positions.

14. The system of claim 13, wherein the boundary vertices and the boundary faces of the particular cells have positions in the SDF grid based on a boundary between a first group of cells inside or within a threshold distance of the surface and a second group of cells that includes the other cells of the SDF grid excluding the first group of cells.

15. The system of claim 13, wherein the corner gradients include at least one corrected corner gradient that is corrected from at least one invalid corner gradient caused by a portion of the object being positioned between cell centers of two adjacent cells in the SDF grid such that no cell centers are positioned inside the portion of the object.

16. The system of claim 13, wherein the operations further comprise, after determining the offset cell positions:

for each boundary vertex of the boundary mesh, selecting a point closest to the boundary vertex for points on displaced features based on the offset cell positions of the one or more neighboring cells of the boundary vertex, wherein the mesh vertices of the adjusted mesh are the selected points.

17. The system of claim 16, wherein the displaced features are features of a hypercube formed from centers of the one or more neighboring cells of the boundary vertex.

18. The system of claim 13, wherein the operations further comprise generating an object surface based on the adjusted mesh, the object surface displayable by a display device.

19. A non-transitory computer-readable medium with instructions stored thereon that, when executed by a processor, cause the processor to perform operations comprising:

obtaining a signed distance field (SDF) grid that includes a plurality of cells, wherein the cells of the SDF grid include cell values that indicate distances of the cells to a surface that the SDF grid encompasses, the surface distinguishing an inside and an outside of an object;

determining a boundary mesh having boundary vertices and boundary faces of particular cells in the SDF grid that are based at least on cells that are within a threshold distance of the surface;

determining offset cell positions for centers of neighboring cells that neighbor the boundary mesh, wherein the offset cell positions are based on corner gradients of the neighboring cells; and generating an adjusted mesh that approximates the surface, wherein the adjusted mesh is defined by mesh vertices that are based on the boundary vertices of the boundary mesh that are displaced based on the offset cell positions.

20. The non-transitory computer-readable medium of claim 19, wherein the corner gradients include at least one corrected corner gradient that is corrected from at least one invalid corner gradient.

\* \* \* \* \*